(12) United States Patent
Sulakhe

(10) Patent No.: US 10,857,464 B2
(45) Date of Patent: Dec. 8, 2020

(54) COMMUNICATION DEVICES AND METHODS FOR USE WITH GAMING DEVICES TO ASSIST IN GAMEPLAY

(71) Applicant: RAZER (ASIA-PACIFIC) PTE. LTD., Singapore (SG)

(72) Inventor: Nikhil Atul Sulakhe, San Francisco, CA (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 16/313,571

(22) PCT Filed: Jun. 29, 2016

(86) PCT No.: PCT/SG2016/050302
§ 371 (c)(1),
(2) Date: Dec. 27, 2018

(87) PCT Pub. No.: WO2018/004453
PCT Pub. Date: Jan. 4, 2018

(65) Prior Publication Data
US 2019/0143218 A1    May 16, 2019

(51) Int. Cl.
| | |
|---|---|
| *A63F 13/5375* | (2014.01) |
| *A63F 13/55* | (2014.01) |
| *A63F 13/35* | (2014.01) |
| *A63F 13/847* | (2014.01) |
| *A63F 13/26* | (2014.01) |
| *A63F 13/87* | (2014.01) |
| *A63F 13/822* | (2014.01) |
| *A63F 13/69* | (2014.01) |

(52) U.S. Cl.
CPC ......... *A63F 13/5375* (2014.09); *A63F 13/26* (2014.09); *A63F 13/35* (2014.09); *A63F 13/55* (2014.09); *A63F 13/69* (2014.09); *A63F 13/822* (2014.09); *A63F 13/847* (2014.09); *A63F 13/87* (2014.09); *A63F 2300/305* (2013.01); *A63F 2300/807* (2013.01); *A63F 2300/8029* (2013.01)

(58) Field of Classification Search
None
See application file for complete search history.

(56) References Cited

U.S. PATENT DOCUMENTS

| | | | |
|---|---|---|---|
| 8,595,336 B1 * | 11/2013 | Tsern | A63F 13/26 709/221 |
| 8,745,658 B2 | 6/2014 | Carney et al. | |

(Continued)

FOREIGN PATENT DOCUMENTS

| | | |
|---|---|---|
| EP | 2015854 A1 | 1/2009 |

OTHER PUBLICATIONS

International Search Report and Written Opinion, dated Mar. 29, 2017, for the corresponding International Application No. PCT/SG2016/050302 in 9 pages.

(Continued)

*Primary Examiner* — Jason T Yen
(74) *Attorney, Agent, or Firm* — Polsinelli PC

(57) ABSTRACT

According to various embodiments, a communication method may be provided. The communication method may include: generating a hint on solving a situation in an electronic game; and transmitting the hint to a server configured to provide the hint to gamers playing the electronic game.

19 Claims, 18 Drawing Sheets

(56) References Cited

U.S. PATENT DOCUMENTS

| | | | |
|---|---|---|---|
| 8,763,060 B2 | 6/2014 | Jerremy | |
| 8,793,730 B2 | 7/2014 | Mowrey et al. | |
| 9,170,667 B2 | 10/2015 | Stachniak et al. | |
| 2001/0009867 A1 | 7/2001 | Sakaguchi et al. | |
| 2003/0109305 A1* | 6/2003 | Gavin | A63F 13/54 463/31 |
| 2005/0246638 A1* | 11/2005 | Whitten | A63F 13/5375 715/708 |
| 2005/0266908 A1* | 12/2005 | Hattori | A63F 13/54 463/9 |
| 2009/0063463 A1 | 3/2009 | Turner et al. | |
| 2009/0098919 A1* | 4/2009 | Yuji | A63F 13/822 463/9 |
| 2009/0118015 A1 | 5/2009 | Chang et al. | |
| 2009/0227368 A1* | 9/2009 | Wyatt | A63F 13/10 463/31 |
| 2010/0041475 A1 | 2/2010 | Zalewski et al. | |
| 2011/0281648 A1* | 11/2011 | Weising | A63F 13/798 463/32 |
| 2011/0296472 A1 | 12/2011 | Soldan et al. | |
| 2012/0089923 A1 | 4/2012 | Pettit et al. | |
| 2012/0233646 A1 | 9/2012 | Coniglio et al. | |
| 2013/0005471 A1* | 1/2013 | Chung | A63F 13/12 463/42 |
| 2013/0116022 A1 | 5/2013 | Davison et al. | |
| 2013/0227013 A1 | 8/2013 | Maskatia et al. | |
| 2013/0244784 A1 | 9/2013 | Assa | |
| 2014/0179427 A1* | 6/2014 | Miura | A63F 13/00 463/31 |
| 2014/0201378 A1 | 7/2014 | Elliott et al. | |
| 2014/0259081 A1 | 9/2014 | Chatterjee | |
| 2014/0331265 A1 | 11/2014 | Mozell et al. | |
| 2015/0381606 A1 | 12/2015 | Srivastav | |
| 2016/0066053 A1 | 3/2016 | Bielman | |

OTHER PUBLICATIONS

Matthias Böhmer and Antonio Krüger, "A Case Study of Research Through the App Store: Leveraging the System UI as a Playing Field for Improving the Design of Smartphone Launchers", International Journal of Mobile Human Computer Interaction, v 6, n 2, p. 32-45, Apr. 1, 2014; ISSN: 1942390X, E-ISSN: 19423918.

Pavle Skoir, et al., Abstract of "Implementation of Agent-Based Games Recommendation System on Mobile Platforms", University of Zagreb, Advances in Intelligent Systems and Computing, v 296, p. 67-76, 2014; ISSN: 21945357; ISBN-13: 9783319076492; DOI: 10.1007/978-3-319-07650-8_8; Conference on Agent and Multi Agent Systems—Technologies and Applications, KES-AMSTA 2014, Jun. 18, 2014; Publisher: Springer Verlag.

Dharma Surya Pradana and Ridi Ferdiana, Abstract of "Mobile Applications Rating Assessments Based on Users Experience Perception", Electrical Engineering and Informatics (MICEEI), 2014 Makassar International Conference on Date of Conference: Nov. 26-30, 2014, https://ieeexplore.ieee.org/document/7067334.

Extended European Search Report dated Feb. 28, 2019, 9 pages, for the corresponding European Patent Application No. 16907484.6.

* cited by examiner

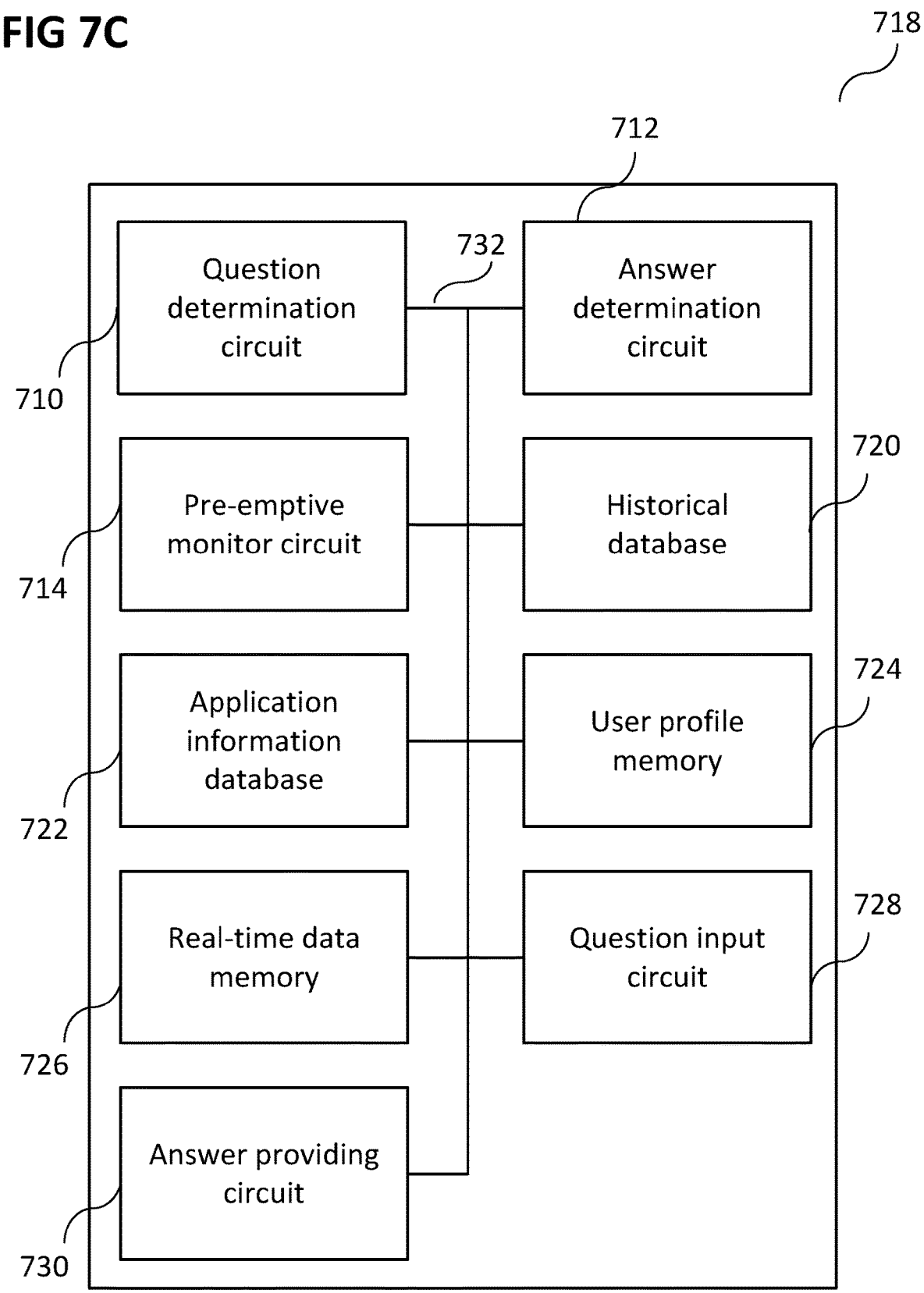

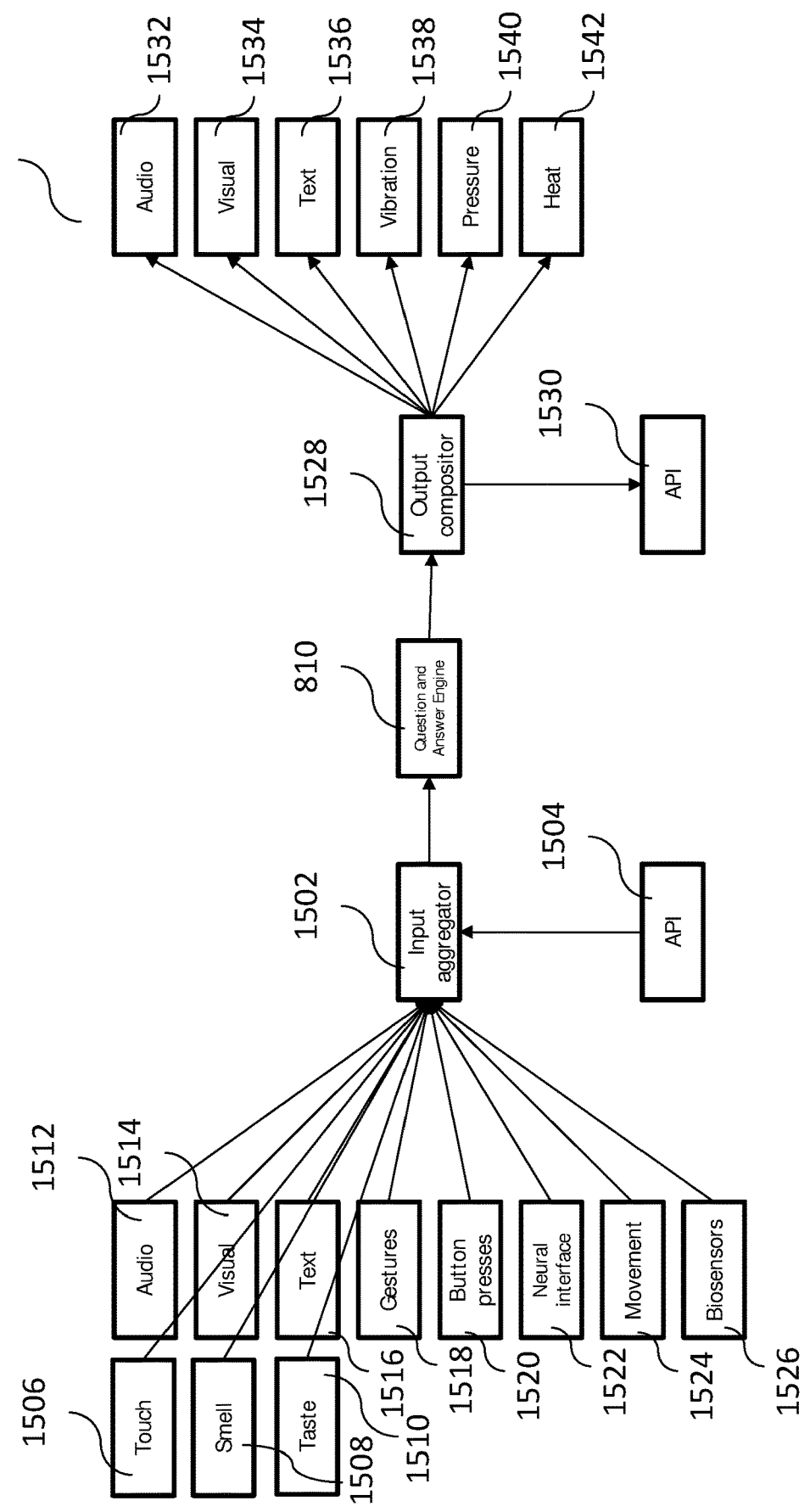

US 10,857,464 B2

COMMUNICATION DEVICES AND METHODS FOR USE WITH GAMING DEVICES TO ASSIST IN GAMEPLAY

TECHNICAL FIELD

Various embodiments generally relate to communication methods, computer-readable media, communication devices, and servers.

BACKGROUND

Gamers may get stuck during game play and may be forced to pause game play in order to research on how to proceed. Thus, there may be a need to facilitate game play for gamers.

SUMMARY OF THE INVENTION

According to various embodiments, a communication method may be provided. The communication method may include: generating a hint on solving a situation in an electronic game; and transmitting the hint to a server configured to provide the hint to gamers playing the electronic game.

According to various embodiments, a communication method may be provided. The communication method may include: receiving a hint on solving a situation in an electronic game; storing the hint on a server; and providing the hint to gamers playing the electronic game.

According to various embodiments, a computer-readable medium may be provided. The computer-readable medium may include instructions which, when executed by a computer, make the computer (wherein it will be understood that a computer may be any device configured to execute instructions, for example a personal computer (PC), a console, a mobile radio communication device, or a table device) perform a communication method. The communication method may include: generating a hint on solving a situation in an electronic game; and transmitting the hint to a server configured to provide the hint to gamers playing the electronic game.

According to various embodiments, a computer-readable medium may be provided. The computer-readable medium may include instructions which, when executed by a computer, make the computer perform a communication method. The communication method may include: receiving a hint on solving a situation in an electronic game; storing the hint on a server; and providing the hint to gamers playing the electronic game.

According to various embodiments, a communication device may be provided. The communication device may include: a hint generation circuit configured to generate a hint on solving a situation in an electronic game; and a transmitter configured to transmit the hint to a server configured to provide the hint to gamers playing the electronic game.

According to various embodiments, a server may be provided. The server may include: a receiver configured to receive a hint on solving a situation in an electronic game; a storage configured to store the hint; and a transmitter configured to provide the hint to gamers playing the electronic game.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which:

FIG. 7C shows a data providing system according to various embodiments;

FIG. 15 shows an illustration of a user interface according to various embodiments.

DETAILED DESCRIPTION

Figure 1A:
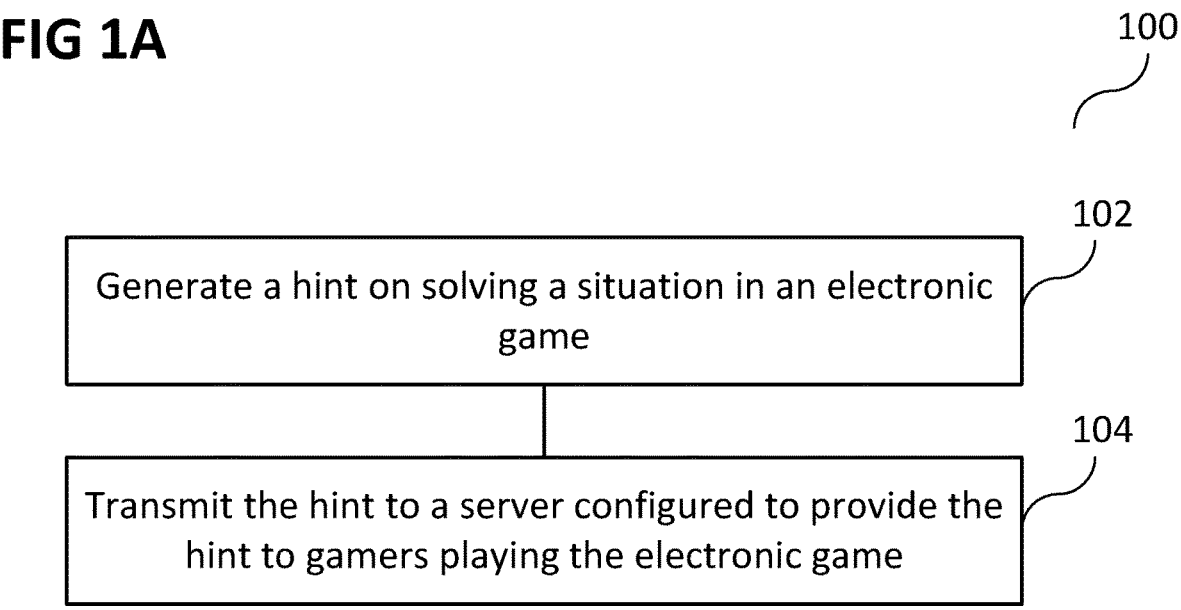
FIG. 1A shows a flow diagram illustrating a communication method according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the communication device as described in this description may include a memory which is for example used in the processing carried out in the communication device. In this context, the server as described in this description may include a memory which is for example used in the processing carried out in the server. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

FIG. 1A shows a flow diagram 100 illustrating a communication method according to various embodiments. In 102, a hint on solving a situation in an electronic game (for example computer game or a console game) may be generated. In 104, the hint may be transmitted to a server configured to provide the hint to gamers playing the electronic game.

In other words, a user may provide a hint for an electronic game he is playing to a server, which in turn may provide the hint to other gamers.

According to various embodiments, the hint may include or may be included in at least one of textual information, audio information, or video information.

According to various embodiments, the hint may be generated on a companion device configured to display a further hint.

According to various embodiments, the communication method may further include transmitting a vote for the further hint.

Figure 1B:
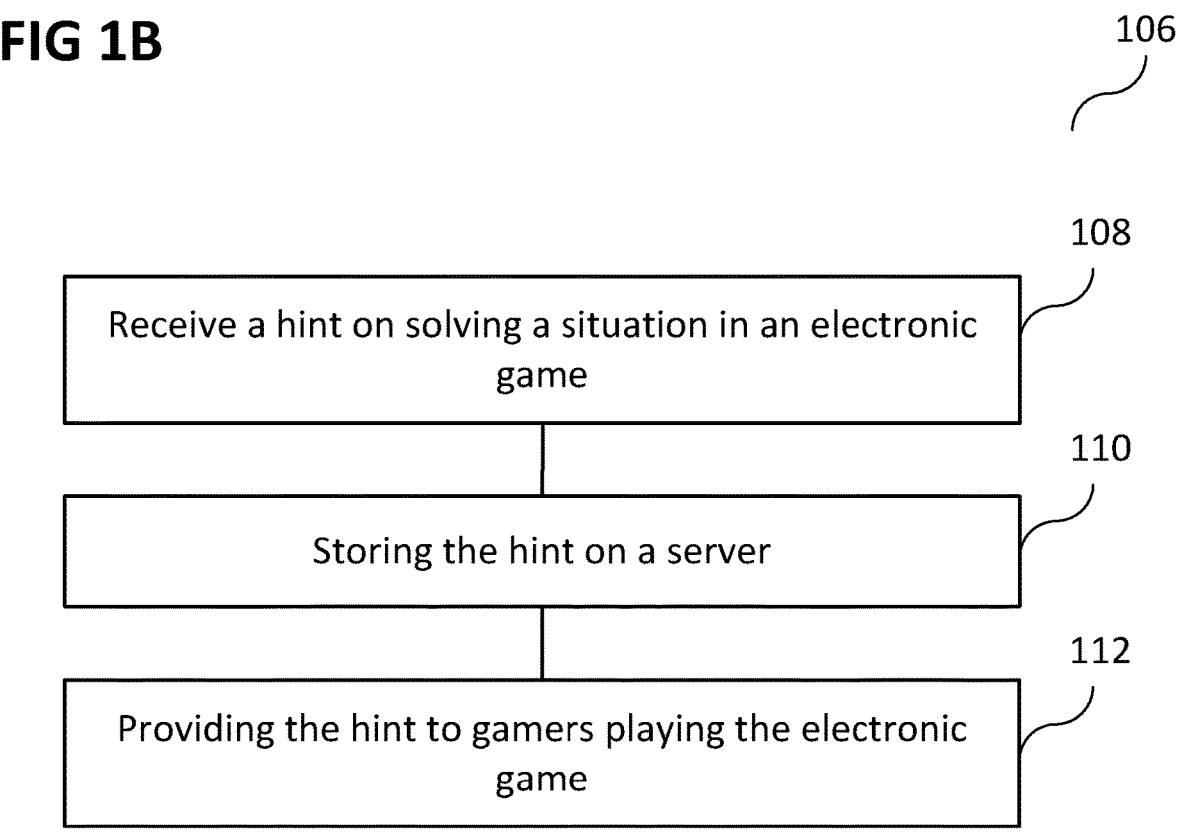
FIG. 1B shows a flow diagram illustrating a communication method according to various embodiments.

FIG. 1B shows a flow diagram 106 illustrating a communication method according to various embodiments. In 108, a hint on solving a situation in an electronic game (for example a computer game or a console game) may be received. In 110, the hint may be stored on a server (for example in a storage (in other words: memory) of the server). In 112, the hint may be provided to gamers playing the electronic game.

According to various embodiments, the hints may include or may be included in at least one of textual information, audio information, or video information.

According to various embodiments, the communication method may further include storing a plurality of hints for a same situation on the server.

According to various embodiments, the communication method may further include receiving a vote for at least one hint of the plurality of hints.

According to various embodiments, a hint of the plurality of hints with a highest number of votes among the plurality of hints may be provided to the gamers.

According to various embodiments, the hint may be provided as at least one of an overlay to the electronic game or as a notification in a companion app.

According to various embodiments, a computer-readable medium may be provided. The computer-readable medium may include instructions which, when executed by a computer, make the computer perform a communication method. The communication method may include: generating a hint on solving a situation in an electronic game (for example a computer game or a console game); and transmitting the hint to a server configured to provide the hint to gamers playing the electronic game.

According to various embodiments, the hint may include or may be included in at least one of textual information, audio information, or video information.

According to various embodiments, the hint may be generated on a companion device configured to display a further hint.

According to various embodiments, the computer-readable medium may further include instructions which, when executed by a computer, make the computer perform transmitting a vote for the further hint.

According to various embodiments, a computer-readable medium may be provided. The computer-readable medium may include instructions which, when executed by a computer, make the computer perform a communication method. The communication method may include: receiving a hint on solving a situation in an electronic game (for example a computer game or a console game); storing the hint on a server; and providing the hint to gamers playing the electronic game.

According to various embodiments, the hints may include or may be included in at least one of textual information, audio information, or video information.

According to various embodiments, the computer-readable medium may further include instructions which, when executed by a computer, make the computer perform: storing a plurality of hints for a same situation on the server.

According to various embodiments, the computer-readable medium may further include instructions which, when executed by a computer, make the computer perform: receiving a vote for at least one hint of the plurality of hints.

According to various embodiments, a hint of the plurality of hints with a highest number of votes among the plurality of hints may be provided to the gamers.

According to various embodiments, the hint may be provided as at least one of an overlay to the electronic game or as a notification in a companion app.

Figure 1C:
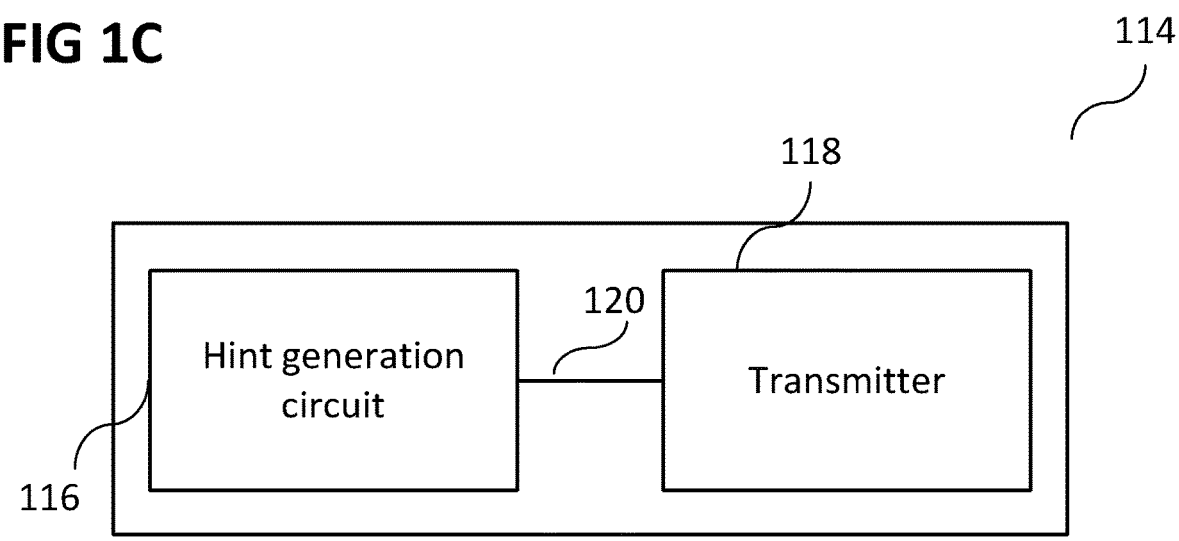
FIG. 1C shows a communication device according to various embodiments.

FIG. 1C shows a communication device 114 according to various embodiments. The communication device 114 may include a hint generation circuit 116 configured to generate a hint on solving a situation in an electronic game (for example a computer game or a console game). The communication device 114 may further include a transmitter 118 configured to transmit the hint to a server configured to provide the hint to gamers playing the electronic game. The hint generation circuit 116 and the transmitter 118 may be coupled with each other, like indicated by line 120, for example electrically coupled, for example using a line or a cable, and/or mechanically coupled.

According to various embodiments, the hint may include or may be included in at least one of textual information, audio information, or video information.

According to various embodiments, the hint may be generated on a companion device configured to display a further hint.

According to various embodiments, the transmitter 118 may further be configured to transmit a vote for the further hint.

Figure 1D:
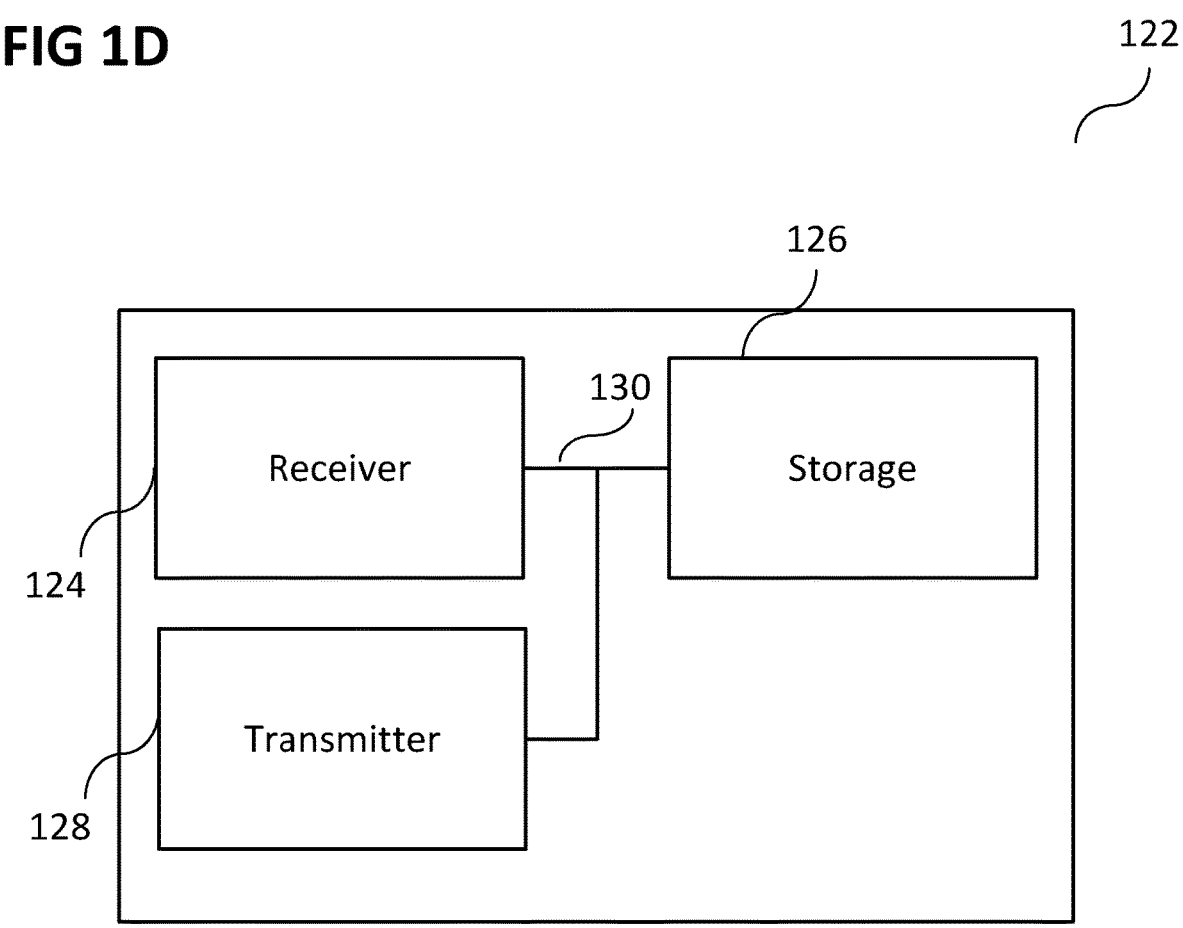
FIG. 1D shows a server according to various embodiments.

FIG. 1D shows a server 122 according to various embodiments. The server 122 may include a receiver 124 configured to receive a hint on solving a situation in an electronic game (for example a computer game or a console game). The server 122 may further include a storage 126 (in other words: a memory) configured to store the hint. The server 122 may further include a transmitter 128 configured to provide the hint to gamers playing the electronic game. The receiver 124, the storage 126, and the transmitter 128 may be coupled with each other, like indicated by lines 130, for example electrically coupled, for example using a line or a cable, and/or mechanically coupled.

According to various embodiments, the hints may include or may be included in at least one of textual information, audio information, or video information.

According to various embodiments, the storage 126 may further be configured to store a plurality of hints for a same situation.

According to various embodiments, the receiver 124 may further be configured to receive a vote for at least one hint of the plurality of hints.

According to various embodiments, the transmitter 128 may be configured to provide a hint of the plurality of hints with a highest number of votes among the plurality of hints to the gamers.

According to various embodiments, the transmitter 128 is configured to provide the hint as at least one of an overlay to the electronic game or as a notification in a companion app.

Figure 2A:
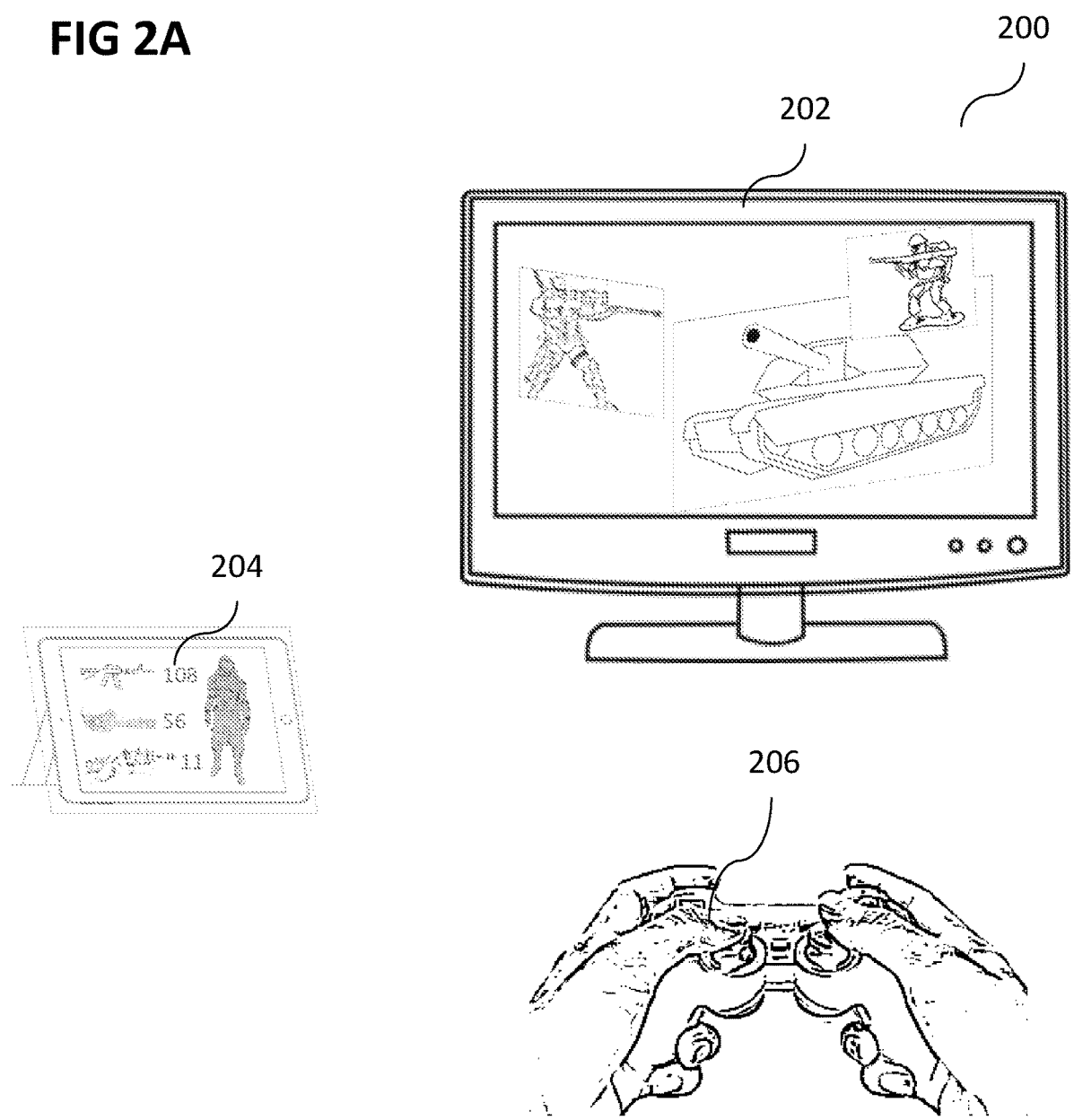
FIG. 2A shows an illustration of an application scenario according to various embodiments.

FIG. 2A shows an illustration 200 of an application scenario according to various embodiments. A user, for example a gamer A, may play a video game on his console (wherein an output of the video game is shown on a display 202, for example a computer screen or a TV (television)), for example using an input device 206, for example a game pad. A companion app (which may for example use a tablet for its output) may be paired and in-sync with the console gameplay. The companion app may be by the user's side, so that the user can see the output of the companion app while playing the video game.

Figure 2B:
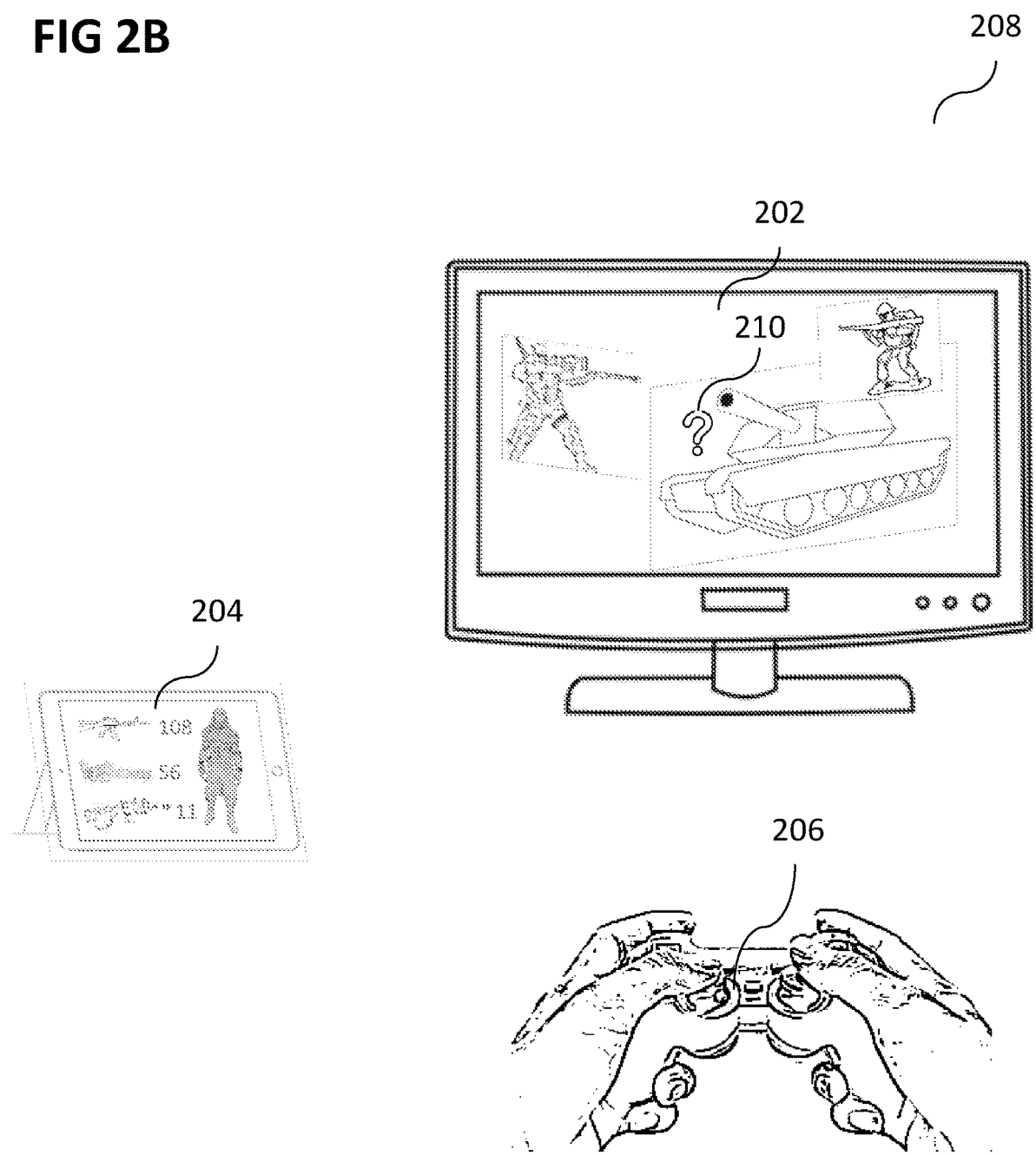
FIG. 2B shows a further illustration of the application scenario of FIG. 2A according to various embodiments.

FIG. 2B shows a further illustration 208 of the application scenario of FIG. 2A according to various embodiments. The gamer may try to destroy an enemy vehicle. After several unsuccessful attempts, a gamer may see a visual hint (for example in the form of a question mark 210) notifying user that help topic is available. The user may seek help through hints. A help notification feature may be provided as a part of an SDK (software development kit) that game developers may use in programming their games. When the gamer is having difficulty in a game, the SDK allows the game system to be smart to display hints option.

Figure 3:
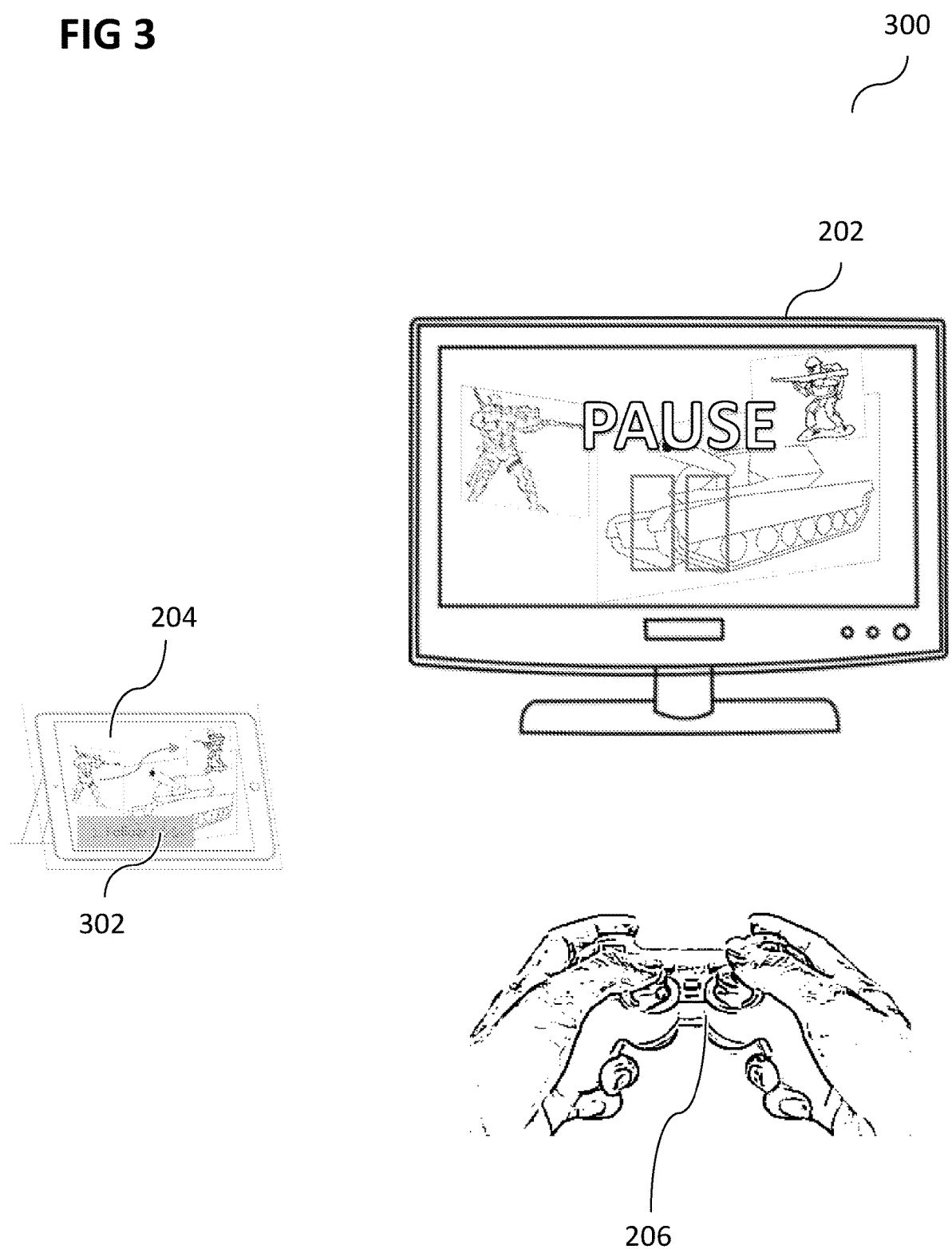
FIG. 3 shows an illustration of a method of getting a hint according to various embodiments.

FIG. 3 shows an illustration 300 of a method of getting a hint according to various embodiments. The companion app may be in-sync with the console gameplay, and as such, the user may get help material (for example text, video, and/or instructions) via the companion app, like indicated by 302 (wherein a textual hint to perform certain action is displayed). While seeking help, the gameplay on the console may pause to let the gamer consume help content via the companion app (for example on his mobile device, for example tablet).

Figure 4:
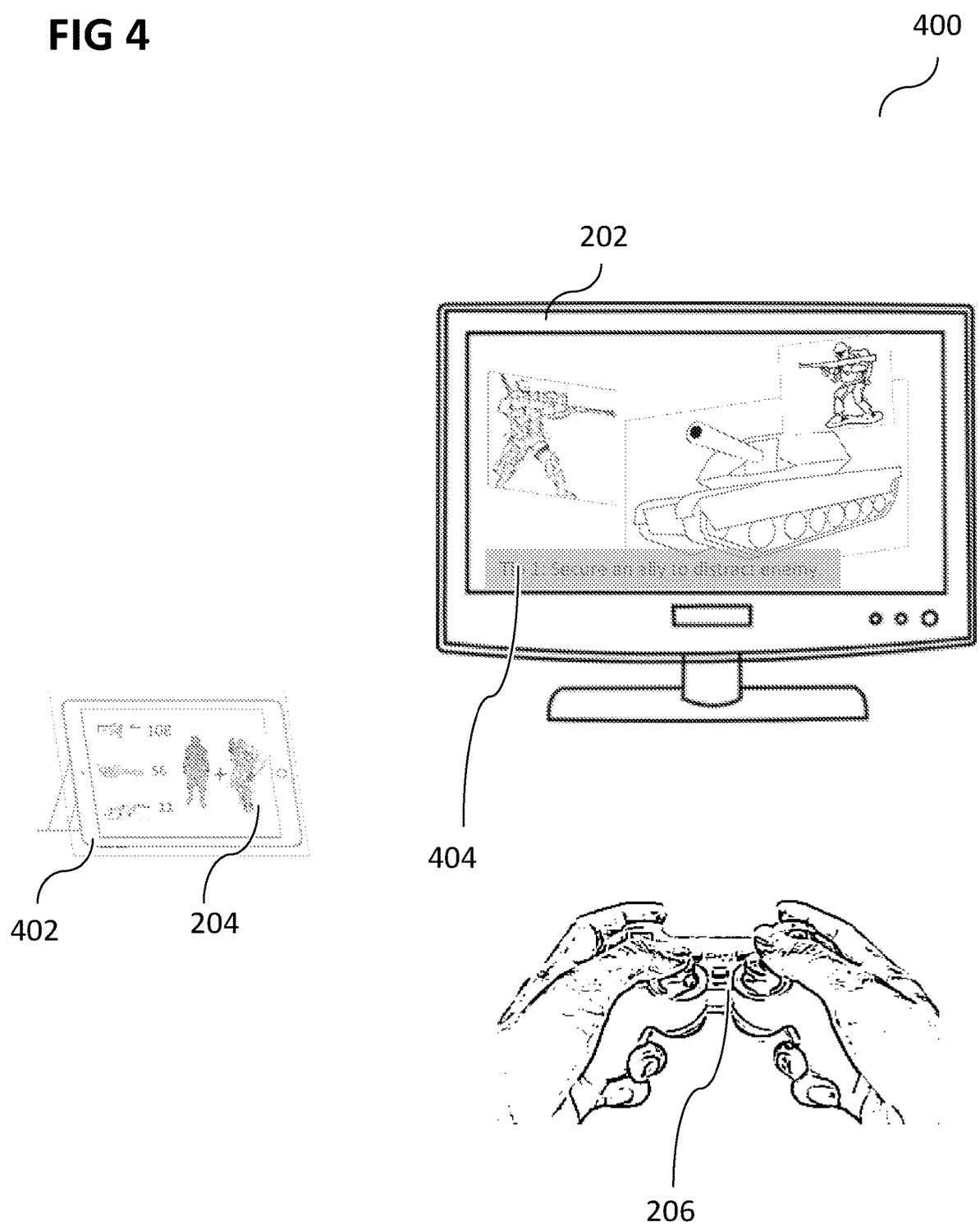
FIG. 4 shows an illustration of a method of getting a hint according to various embodiments.

FIG. 4 shows an illustration 400 of a method of getting a hint according to various embodiments. The gamer may consume help topics directly on the display 202 of his game console (for example TV console) in the form of a translucent overlay 404, while the console gameplay may not pause. The mobile companion app may continue to display additional helpful information 402 via the tablet 204.

After consuming help content (for example like described with reference to FIG. 3 or like described with reference to FIG. 4), a gamer may be able to destroy enemy vehicle and make progress in his game.

If a gamer learns new ways to destroy enemy, he may contribute to the gaming community.

Figure 5:
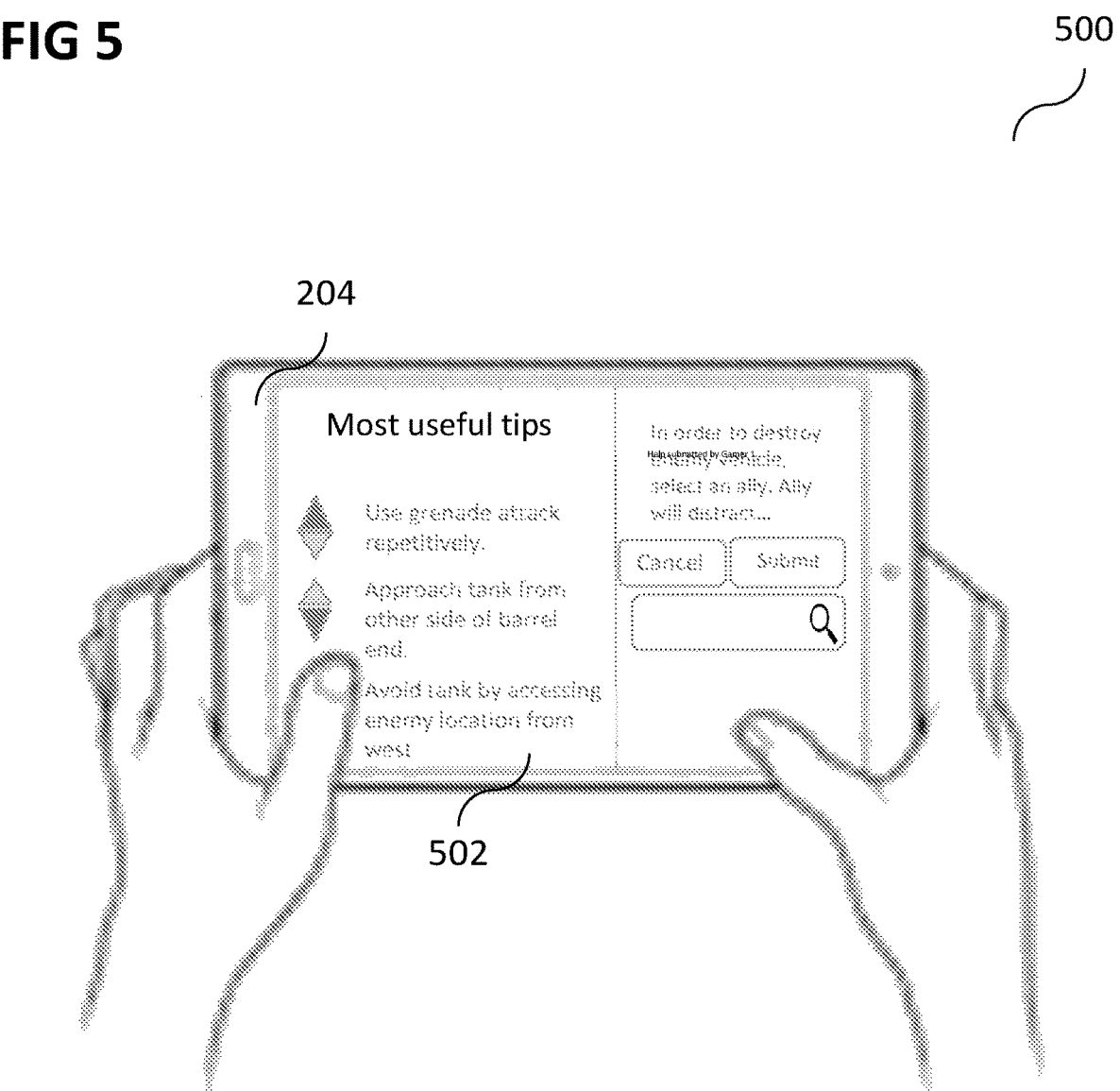
FIG. 5 shows an illustration of contributing to a gaming community according to various embodiments.

FIG. 5 shows an illustration 500 of contributing to a gaming community according to various embodiments. After learning new ways to complete a challenge, the gamer may launch an online portal or smartphone companion app 502, for example on his mobile device or tablet 204. The user may submit his technique and lessons on the portal, and share it with fellow gamers. According to various embodiments, a user interface of the companion app 502 may provide an interface for a user inputting specific information, such as: challenge resolved, helpful tips/comments/video, skill level required, tools/weapons/items need to be owned, or any other information that may be critical to resolving challenge in game.

The gamer community may vote for new techniques of overcoming a challenge. When new gamers discover this content being stuck at similar point in gameplay, they may receive this new content as in-game overlay, depending on how many up-votes it has received.

If now another gamer B plays the same video game on his console with his companion app paired and in-sync with console gameplay, and gamer B has similar unsuccessful attempts in destroying enemy vehicle, gamer B may see the same visual hint (as seen by gamer A) notifying user that help is available. The second user may seek help through hints. Like will be described below with reference to FIG. 6, the help (or hint) provided by gamer A (assuming that suggestions of first gamer received most upvotes for same stage help) may now show up. All gamers who are stuck at same level may see the same help, until another gamer posts his findings (or hints), and those findings receive most upvotes.

Figure 6:
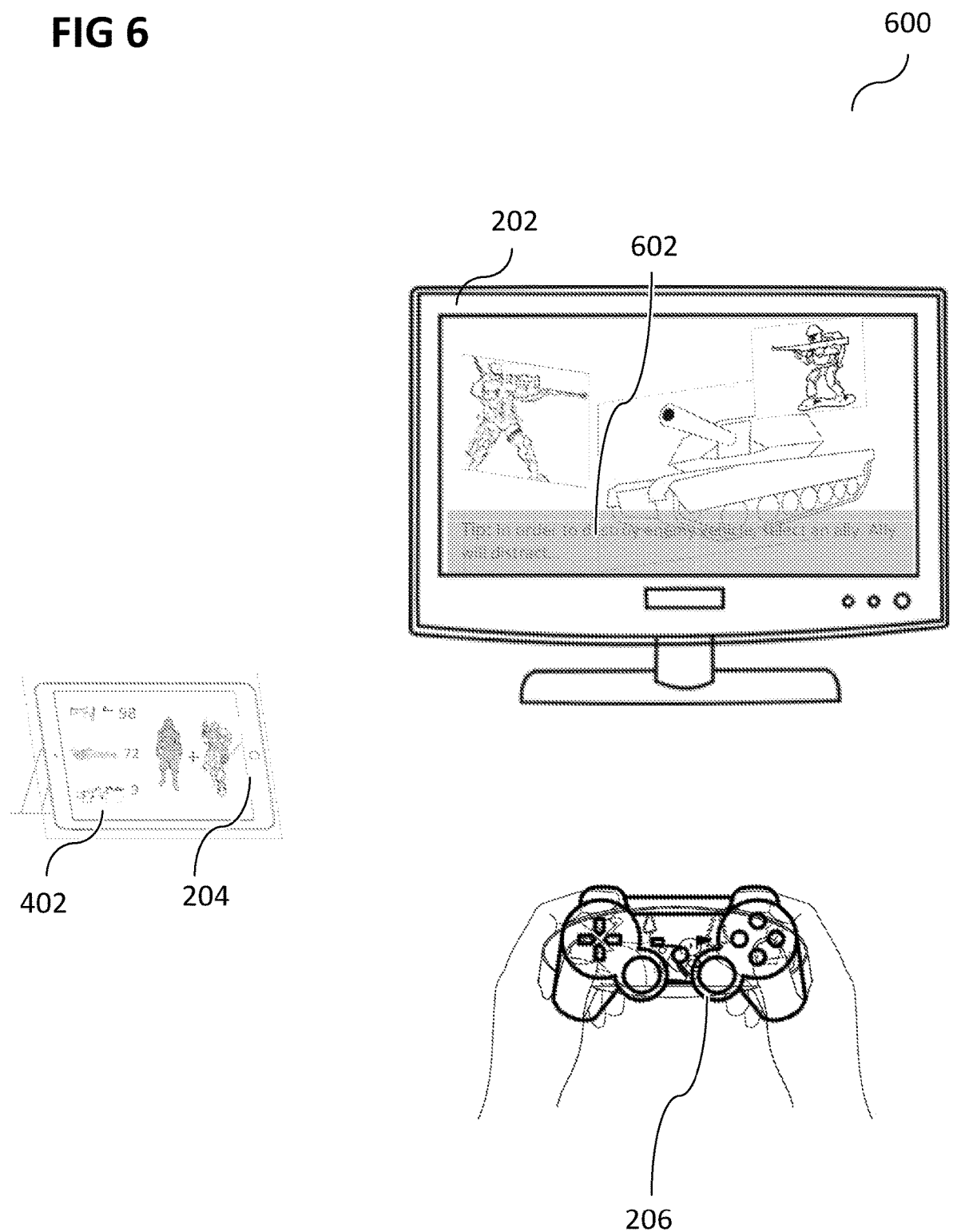
FIG. 6 shows an illustration of receiving a hint provided by the first gamer according to various embodiments.

FIG. 6 shows an illustration 600 of receiving a hint 602 provided by gamer A according to various embodiments.

Various embodiments may enable users/gamers to create their own content. Unlike conventional companion app content, where content is pushed uni-directionally (from studios/game publishers to gamers), the companion app according to various embodiments may provide a bi-directional content flow, where gamers may be able to create their own content and share on Razer's platform for consumption by other gamers.

Various embodiments may provide gamer generated content, and share it with gamers real-time within games, for example as in-game overlay. This content may be likely to change when context remains same, depending on feedback from the gamer community.

According to various embodiments, customized content may be provided which may show up in-game, for example as an overlay, or on a separate mobile communication device (for example a tablet) using a companion app.

With various embodiments, gamers may create content (such as hints, tips, suggestions and other textual content) pertaining to a game or challenge within a game. This content may also be image or video based.

Various embodiments may be considered as a Wikipedia for games, where gamers create their own content, which may be provided as an in-game overlay.

Various embodiments may allow gamers to use their mobile devices for creating content that will then show up in-game as an overlay.

According to various embodiments, a server may be provided which may act as a messenger to share most popular help tips, match making, recommendations and other features.

In various embodiments, users may create their own content, which may be shared via a companion platform on the base platform (for example on the console).

According to various embodiments, content created by gamers may be displayed "in-game" as a game overlay via an SDK.

According to various embodiments, a companion platform as a content creation platform may be provided. When companion platform creates content, it may be pushed to an experience server, from where it may be pushed to game consoles, thereby being consumed by other gamers either on their console or their companion devices.

According to various embodiments, content may be generated by gamers, and shared across the platform for consumption by other gamers.

Various embodiments may provide a platform for gamers to create their own content which may be shared, consumed and edited by gaming community. This content will be embedded in-game as an overlay by using an SDK.

According to various embodiments, companion devices may interact with consoles. According to various embodiments, content may be created, enhanced and shared with the community.

According to various embodiments, a data providing method may be provided. The data providing method may include: determining a hypothetical question of a user using an application program; determining an answer to the hypothetical question; and providing the answer in the form of a hint to the user.

According to various embodiments, a data providing system may be provided. The data providing system may include: a question determination circuit configured to determine a hypothetical question of a user using an application program; an answer determination circuit configured to determine an answer to the hypothetical question; and a pre-emptive monitor circuit configured to provide the answer in the form of a hint to the user.

According to various embodiments, a computer-readable medium may be provided. The computer-readable medium may include instructions which, when executed by a computer, make the computer perform a data providing method. The data providing method may include: determining a hypothetical question of a user using an application program; determining an answer to the hypothetical question; and providing the answer in the form of a hint to the user.

In this context, the data providing system (which may for example be a data providing device) as described in this description may include a memory which is for example used in the processing carried out in the data providing system. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

Gamers may get stuck during game play and may be forced to pause game play in order to research on how to proceed. According to various embodiments, devices and methods may be provided to facilitate game play for gamers. According to various embodiments, a real-time game coach or mentor that provides oral answers to oral questions posed by the gamer may be provided and may help the gamer to avoid situations like these.

According to various embodiments, an AI (artificial intelligence) game mentor (which may be referred to as virtual game coach) may be provided.

According to various embodiments, a real-time game coach/mentor may provide game advice via audio during game play. The real-time game coach may provide answers to oral questions posed by the gamer during game play.

Figure 7A:
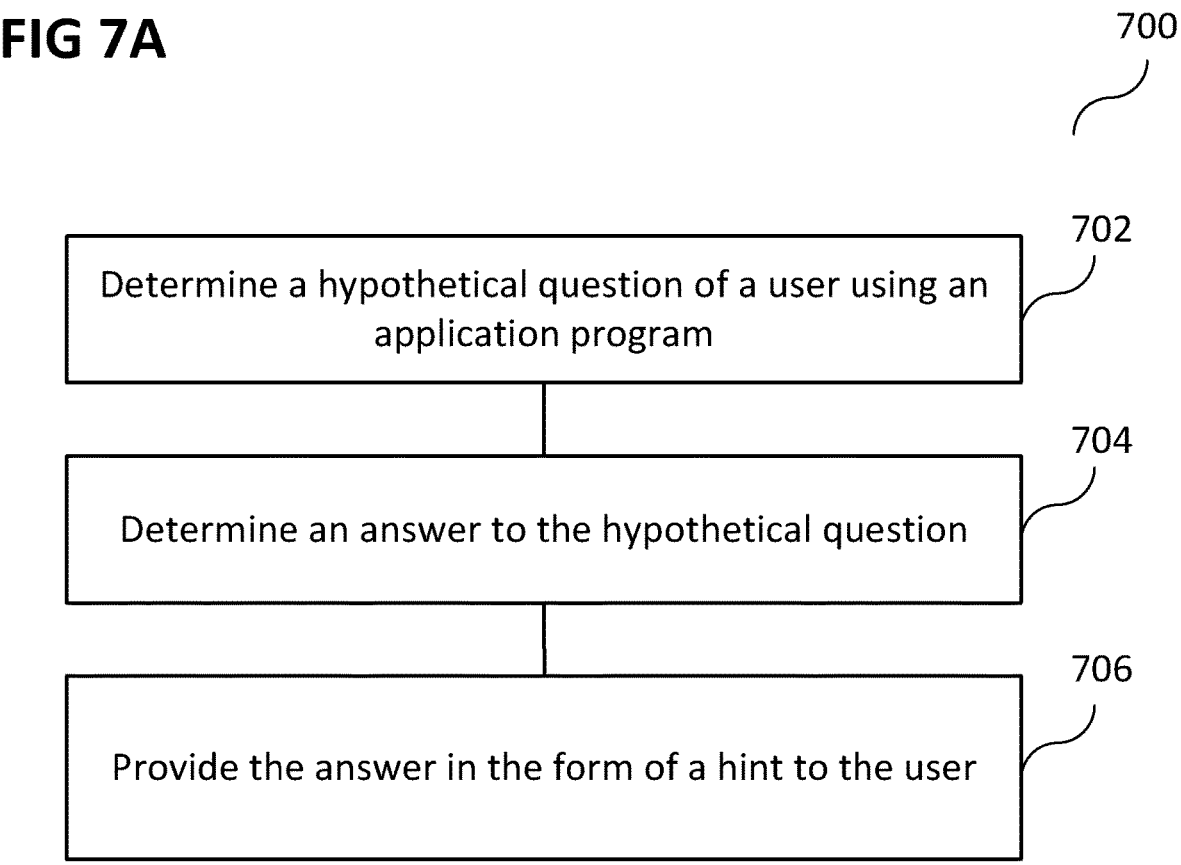
FIG. 7A shows a flow diagram illustrating a data providing method according to various embodiments.

FIG. 7A shows a flow diagram 700 illustrating a data providing method according to various embodiments. In 702, a hypothetical question of a user using an application program may be determined. In 704, an answer to the hypothetical question (for example in relation to the usage of the application program) may be determined. In 706, the answer may be provided in the form of a hint to the user.

In other words, according to various embodiments, an answer to a question that a user might have will be provided.

According to various embodiments, the data providing method may further include: storing history information of at least one further database; and determining the hypothetical question based on the historical information.

According to various embodiments, the data providing method may further include: storing application information about the application program used by the user; and determining the hypothetical question based on the application information.

According to various embodiments, the data providing method may further include: storing profile information of the user; and determining the hypothetical question based on the profile information.

According to various embodiments, the data providing method may further include: storing real-time information of at least one of the application program used by the user or of a system used by the user for executing the application program; and determining the hypothetical question based on the real-time information.

According to various embodiments, the data providing method may further include providing the hint to the user using at least one of audio information, visual information, text information, vibration information, pressure information, and heat information.

According to various embodiments, the data providing method may further include: receiving a question from the user; determining an answer to the receive question; and providing the answer to the user.

According to various embodiments, the data providing method may further include receiving the question from the user using at least one of audio information, visual information, text information, gestures information, button depression information, neural information, movement information, biosensor information, touch information, smell information, or taste information.

According to various embodiments, the data providing method may further include providing the answer to the user using at least one of audio information, visual information, text information, vibration information, pressure information, and heat information.

According to various embodiments, the application program may include or may be or may be included in a computer game.

Figure 7B:
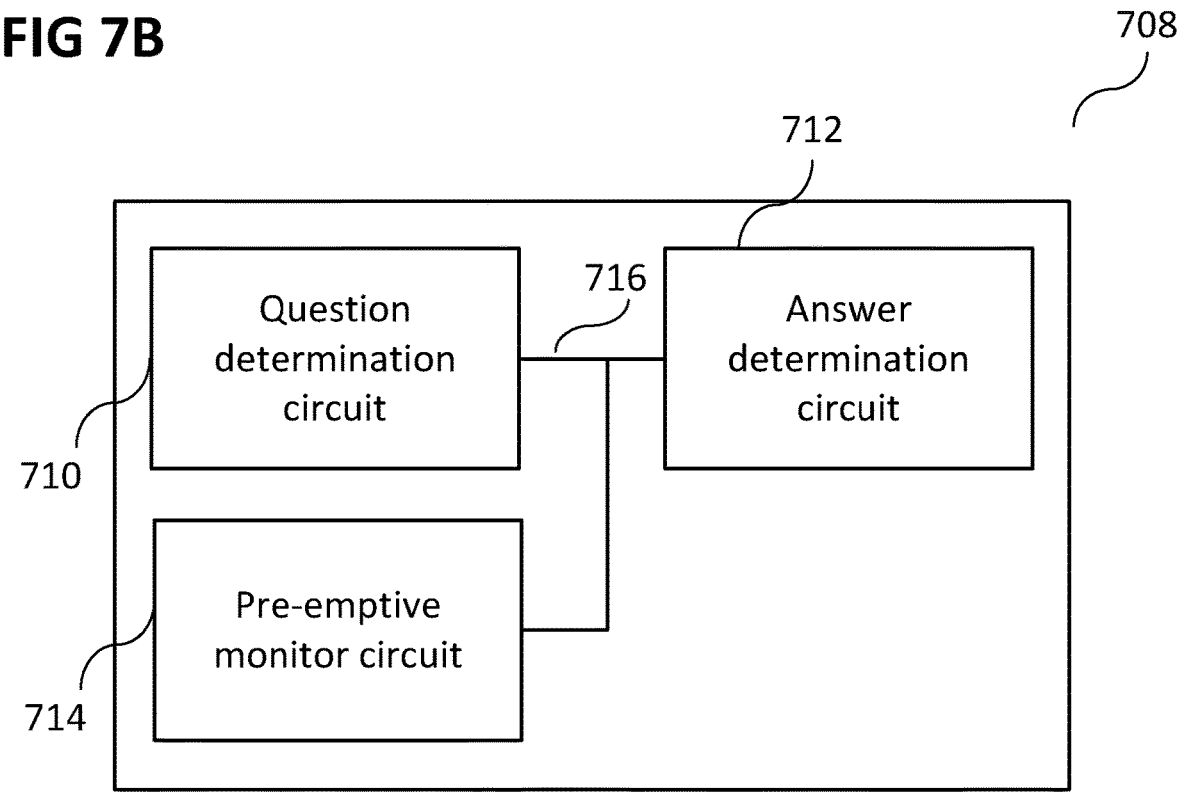
FIG. 7B shows a data providing system according to various embodiments.

FIG. 7B shows a data providing system 708 according to various embodiments. The data providing system 708 may include a question determination circuit 710 configured to determine a hypothetical question of a user using an application program. The data providing system 708 may further include an answer determination circuit 712 configured to determine an answer to the hypothetical question. The data providing system 708 may include a pre-emptive monitor circuit 714 (which may for example be a pre-emptive monitor 812 or a part thereof, like will be described in more detail below) configured to provide the answer in the form of a hint to the user. The question determination circuit 710, the answer determination circuit 712, and the pre-emptive monitor circuit 714 may be coupled with each other, like indicated by lines 716, for example electrically coupled, for example using a line or a cable, and/or mechanically coupled.

FIG. 7C shows a data providing system 718 according to various embodiments. The data providing system 718 may, similar to the data providing system 718 shown in FIG. 7B, include a question determination circuit 710 configured to determine a hypothetical question of a user using an application program. The data providing system 718 may, similar to the data providing system 718 shown in FIG. 7B, further include an answer determination circuit 712 configured to determine an answer to the hypothetical question. The data providing system 718 may, similar to the data providing system 718 shown in FIG. 7B, include a pre-emptive monitor circuit 714 (which may for example be a pre-emptive monitor 812 or a part thereof, like will be described in more detail below) configured to provide the answer in the form of a hint to the user. The data providing system 718 may further include a historical database 720, like will be described in more detail below. The data providing system 718 may further include an application information database 712, like will be described in more detail below. The data providing system 718 may further include a user profile memory 724, like will be described in more detail below. The data providing system 718 may further include a real-time data memory 726, like will be described in more detail below. The data providing system 718 may further include a question input circuit 728, like will be described in more detail below. The data providing system 718 may further include an answer providing circuit 730. The question determination circuit 710, the answer determination circuit 712, the pre-emptive monitor circuit 714, the historical database 720, the application information database 712, the user profile memory 724, the real-time data memory 726, the question input circuit 728, and the answer providing circuit 730 may be coupled with each other, like indicated by lines 732, for example electrically coupled, for example using a line or a cable, and/or mechanically coupled.

According to various embodiments, a historical database 720 (which may correspond to the historical database 802 like described in more detail below) may be configured to store history information of at least one further database. The question determination circuit 710 may be configured to determine the hypothetical question based on the historical information.

According to various embodiments, the application information database (for example the game info database 804 like described in more detail below) may be configured to store application information about the application program used by the user. The question determination circuit 710 may be configured to determine the hypothetical question based on the application information.

According to various embodiments, a user profile memory 724 may be configured to store profile information (for example the player profile 806 like described in more detail below) of the user. The question determination circuit 710 may be configured to determine the hypothetical question based on the profile information.

According to various embodiments, the real-time data memory 726 (for example the real-time data provide 808 like described in more detail below) may be configured to store real-time information of at least one of the application program used by the user or of a system used by the user for executing the application program. The question determination circuit 710 may be configured to determine the hypothetical question based on the real-time information.

According to various embodiments, the pre-emptive monitor circuit 714 maybe is configured to provide the hint to the user using at least one of audio information, visual information, text information, vibration information, pressure information, and heat information.

According to various embodiments, the question input circuit 728 may be configured to receive a question from the user. The answer determination circuit 712 may be configured to determine an answer to the receive question. The answer providing circuit 730 may be configured to provide the answer to the user.

According to various embodiments, the question input circuit 728 may be configured to receive the question from the user using at least one of audio information, visual information, text information, gestures information, button depression information, neural information, movement information, biosensor information, touch information, smell information, or taste information.

According to various embodiments, the answer providing circuit 730 may be configured to provide the answer to the user using at least one of audio information, visual information, text information, vibration information, pressure information, and heat information.

According to various embodiments, the application program may include or may be or may be included in a computer game.

According to various embodiments, a computer-readable medium may be provided. The computer-readable medium may include instructions which, when executed by a computer, make the computer perform a data providing method. The data providing method may include: determining a hypothetical question of a user using an application program; determining an answer to the hypothetical question; and providing the answer in the form of a hint to the user.

According to various embodiments, the computer-readable medium may further include instructions which, when executed by a computer, make the computer perform: storing history information of at least one further database; and determining the hypothetical question based on the historical information.

According to various embodiments, the computer-readable medium may further include instructions which, when executed by a computer, make the computer perform: storing application information about the application program used by the user; and determining the hypothetical question based on the application information.

According to various embodiments, the computer-readable medium may further include instructions which, when executed by a computer, make the computer perform: storing profile information of the user; and determining the hypothetical question based on the profile information.

According to various embodiments, the computer-readable medium may further include instructions which, when executed by a computer, make the computer perform: storing real-time information of at least one of the application program used by the user or of a system used by the user for executing the application program; and determining the hypothetical question based on the real-time information.

According to various embodiments, the computer-readable medium may further include instructions which, when executed by a computer, make the computer perform providing the hint to the user using at least one of audio information, visual information, text information, vibration information, pressure information, and heat information.

According to various embodiments, the computer-readable medium may further include instructions which, when executed by a computer, make the computer perform: receiving a question from the user; determining an answer to the receive question; and providing the answer to the user.

According to various embodiments, the computer-readable medium may further include instructions which, when executed by a computer, make the computer perform receiving the question from the user using at least one of audio information, visual information, text information, gestures information, button depression information, neural information, movement information, biosensor information, touch information, smell information, or taste information.

According to various embodiments, the computer-readable medium may further include instructions which, when executed by a computer, make the computer perform providing the answer to the user using at least one of audio information, visual information, text information, vibration information, pressure information, and heat information.

According to various embodiments, the application program may include or may be or may be included in a computer game.

Figure 8:
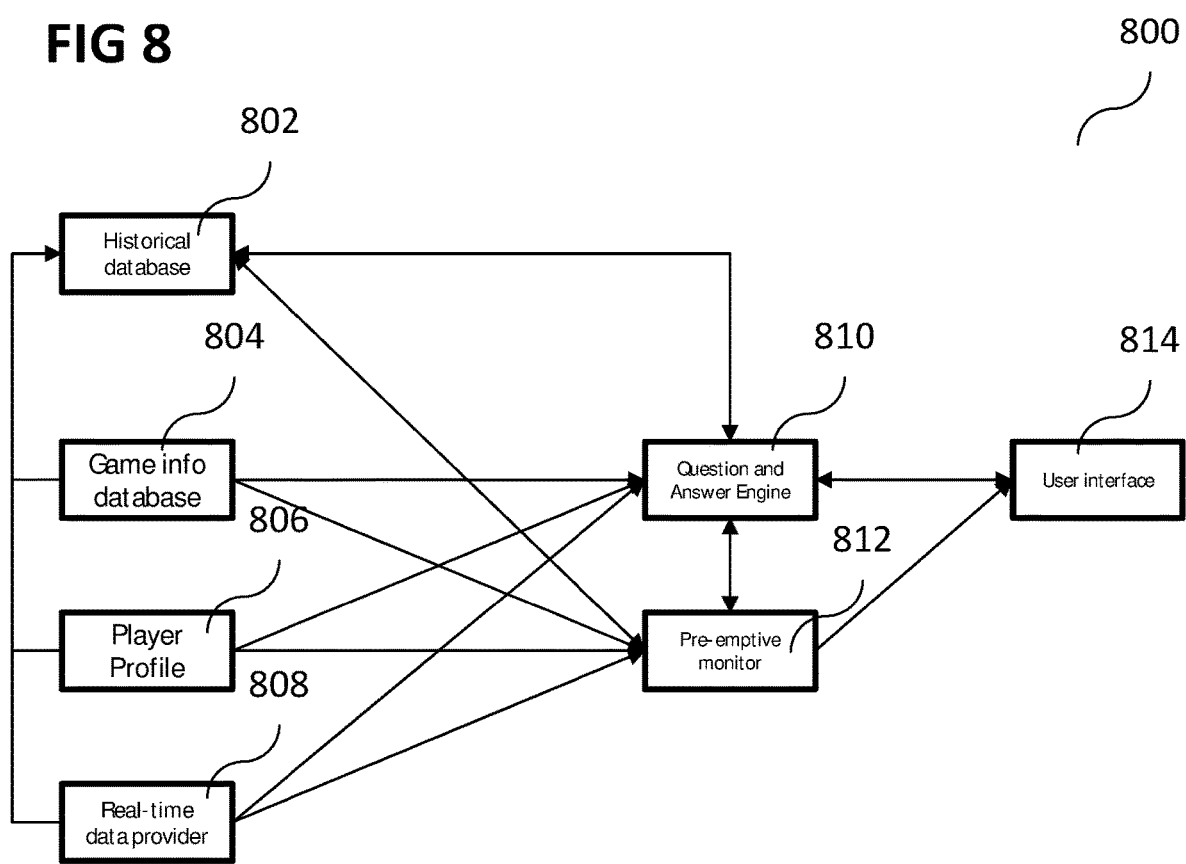
FIG. 8 shows an illustration of an overall mechanism of a system according to various embodiments.

FIG. 8 shows an illustration 800 of an overall mechanism of a system according to various embodiments. The system may include a collection of data sources, processing engines and an interface to users. For example, the system may include a historical database 802, a game info database 804, a player profile 806, a real-time data provider 808, a question and answer engine 810 (in other words: question and answer module or question and answer circuit) which intelligently processes the data provided by a user interface 814, and a pre-emptive monitor 812 which continuously analyses and provide suggestions to the user.

According to various embodiments, the system according to various embodiments may be designed to be cyclic so that the system can learn and improve itself.

Figure 9:
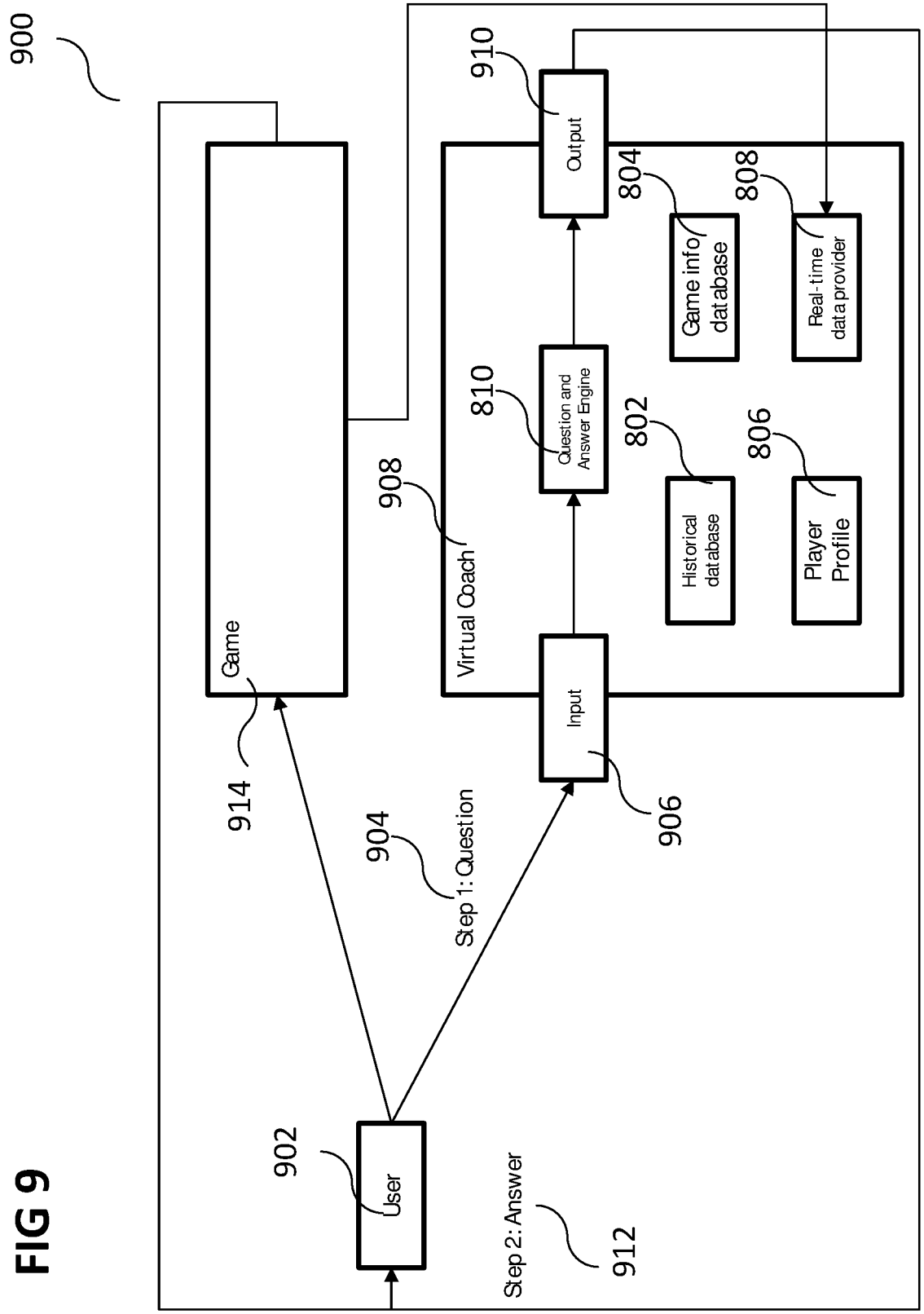
FIG. 9 shows an illustration of a question and answer flow according to various embodiments.

FIG. 9 shows an illustration 900 of a question and answer flow according to various embodiments. The diagram of illustration 900 shows how a user would initiate a question to a system and get a response from it according to various embodiments. A user 902 may initiate a question 904 to the system, for example providing an input 905 into the system, through one or more forms of input supported by the system. The question and answer engine 810 may process the question and based on the collection of data available to it, formulate an answer. This answer may then be provided back the user 902 through one or more forms of output 910 supported by the system. It will be understood that several of the components shown in FIG. 9 may collectively be referred to as virtual coach 908. It is to be noted that the user 902 may continue to play his game 914 and his game 914 may continue to provide updated data to the system. The questions and answers may be overlaid on top of the user interactions that user 902 is already experiencing as part of the game 914 he is playing.

Figure 10:
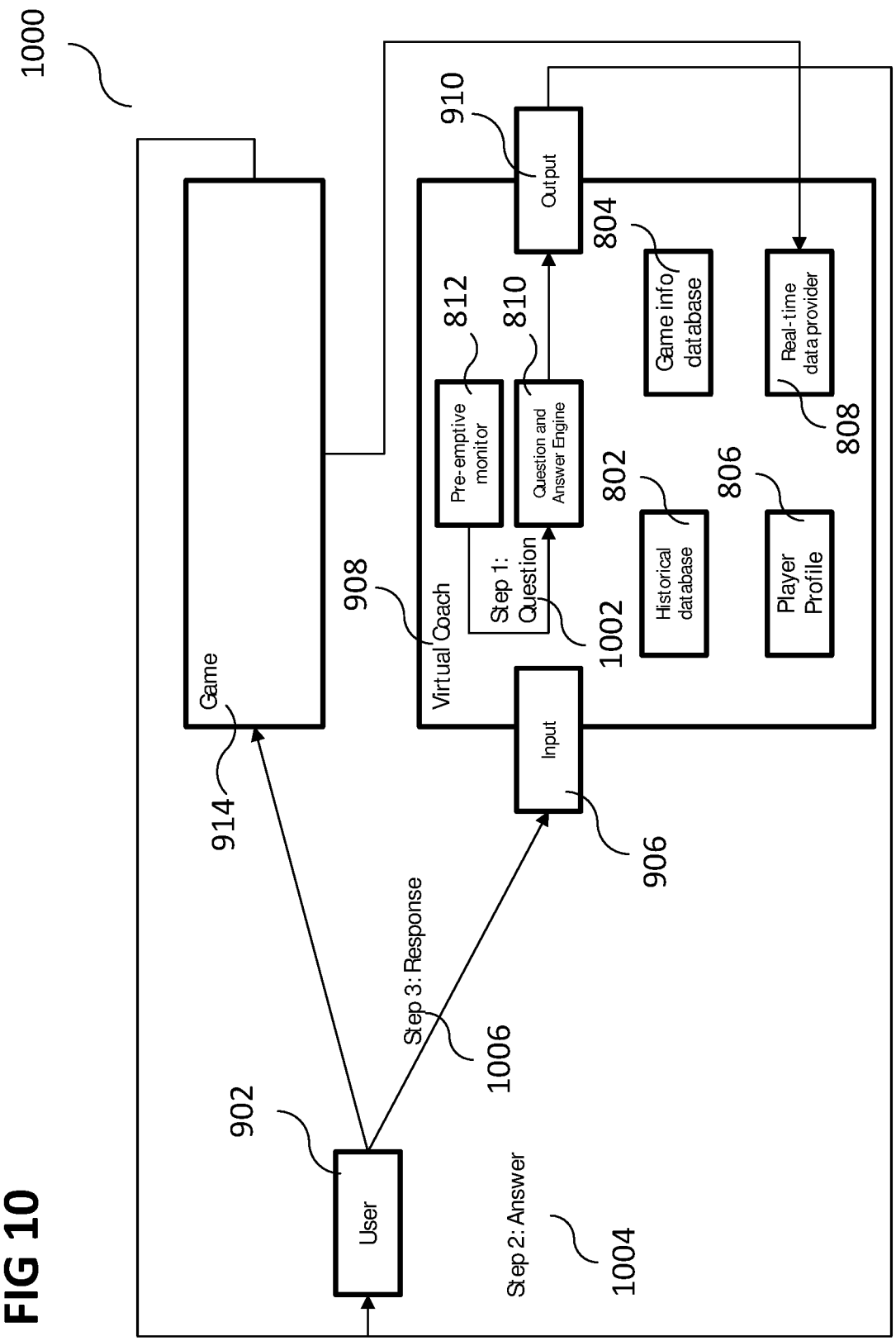
FIG. 10 shows an illustration of a pre-emptive monitor flow according to various embodiments.

FIG. 10 shows an illustration 1000 of a pre-emptive monitor flow according to various embodiments. The diagram of illustration 1000 shows how the pre-emptive monitor 812 provides user 902 with hints or guides that might be relevant to the user. The pre-emptive monitor 812 may analyze the collection of data available to the system and may figure out if there is information that it would like to present to the user 902. The pre-emptive monitor 812 may be responsible for forming the question 1002 that would be forwarded to the question and answer engine 810. The answer 1004 may be presented to the user 902 as a hint. The user 902 may be able to respond (like illustrated by arrow 1006) and continue with more questions and answers, play the game 914 according to the advice or ignore the hint completely. Such an interaction may also be overlaid on top of the game 914 and may be designed to augment instead of interrupting the game play.

Figure 11:
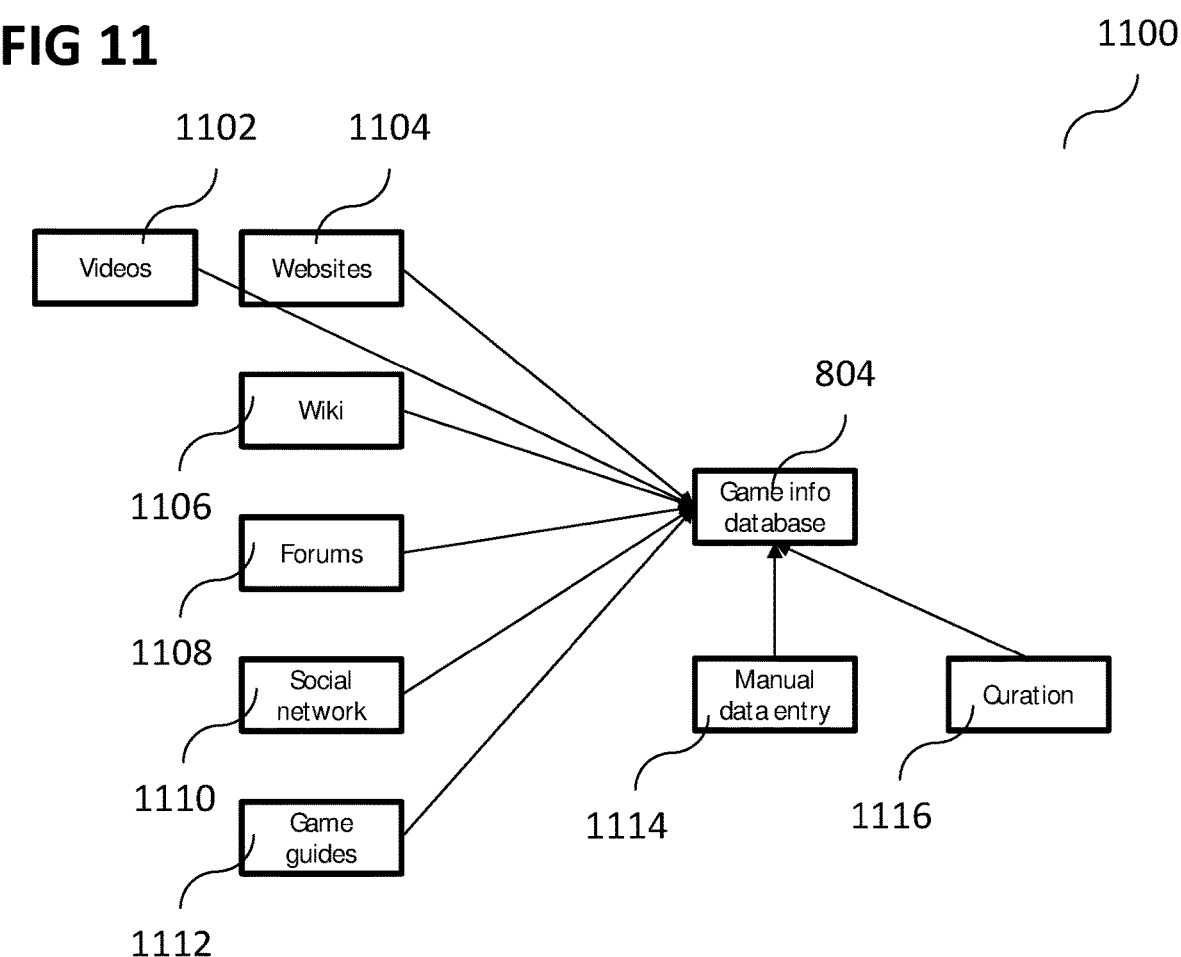
FIG. 11 shows an illustration of a data info database according to various embodiments.

FIG. 11 shows an illustration 1100 of a data info database (in other words: a game info database 804) according to various embodiments. The game info database 804 may be considered as the repository of all known information of any game that is supported according to various embodiments. This may include basic information like the type of game, the characters/hero/classes in that game and this may extend deep into the game such strategy and guides of each character/class. According to various embodiments, the game info database 804 may be populated by various methods:
  Crawling external webpages 1104;
  User direct manipulation via a wiki 1106 or by flagging changes to data (for example curation 1116);
  Direct manipulation (in other words: manual data entry 1114) from internal staff or an admin.

Further input to the game info database 804 may be videos 1102, forums 1108, social networks 1110, or game guides 1112.

Figure 12:
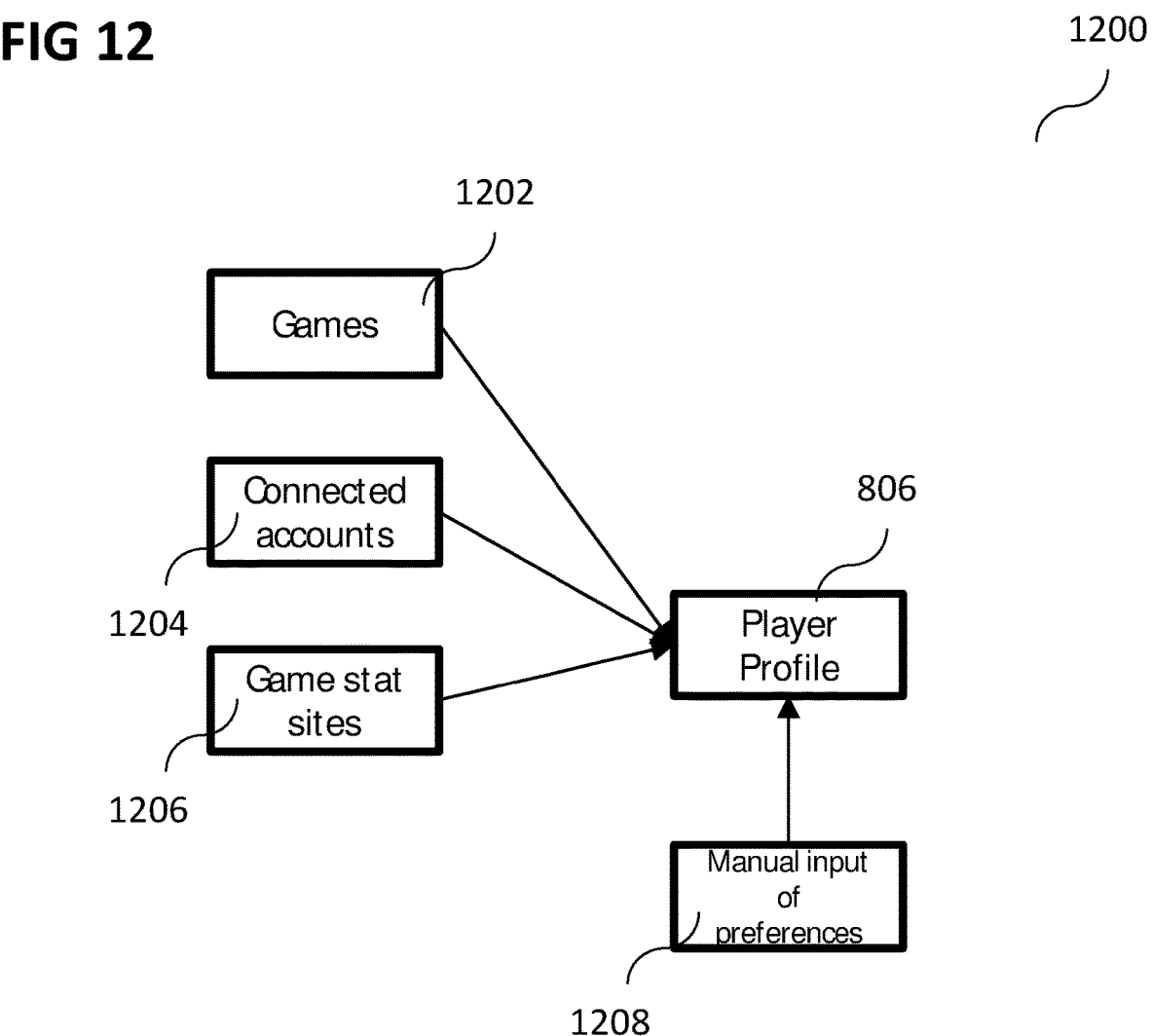
FIG. 12 shows an illustration of a player profile according to various embodiments.

FIG. 12 shows an illustration 1200 of a player profile 806 according to various embodiments. The player profile 806 may include or may consist of information that may be known about every user on the platform. This may be a combination of preferences that the user may explicitly provide (for example using a manual input of preferences 1208) and data that may be gathered from a user's game play. For example, this may include information that list out the games 1202 that he owns, he plays and the time spent on each game. However, this may be extremely deep and may also include the preferred character/hero/champion that he plays, the results of the matches that he plays and the environment of that match such as the hero of the other players in the game and the players behind those heroes.

The player profile 806 may be constructed from various sources:
  Preferences that the user provides (for example via the manual input of preferences 1208);
  Having the user have a software that monitors his game plays and build a historical data on the way he plays, the choices of heroes/class/champion or equipment;
  Crawl/Scrape or integrate with game sites (for example game stat sites 1206) which collect match information and performance information of each user (for example, there may be websites which provide very deep information on game plays, and which may give very detailed information on how a particular gamer performs in his games; different people may have different playstyles and different strengths, and in competitive games, they may also meet up with people with different playstyles and strengths; all of this may be made complicated by the different strengths and weakness of each hero that the game picked and how skilled that particular gamer is in controlling that particular hero, and all this may contribute to how good a recommendation/answer to the gamer is);
  Past queries and responses and how a user responded to those (for example, information on past queries and answers given to a particular and how that user responded and performed under those replies or guidance user may be collected and stored); and/or
  connected accounts 1204 (which for example may refer to connecting a game account to the system according to various embodiments so that the system according to various embodiments may get more information about that user from the account that he has connected; for example, a profile page of a game may provide plenty of information that may be used to help the engine according to various embodiments to come up with a better answer/hint).

Figure 13:
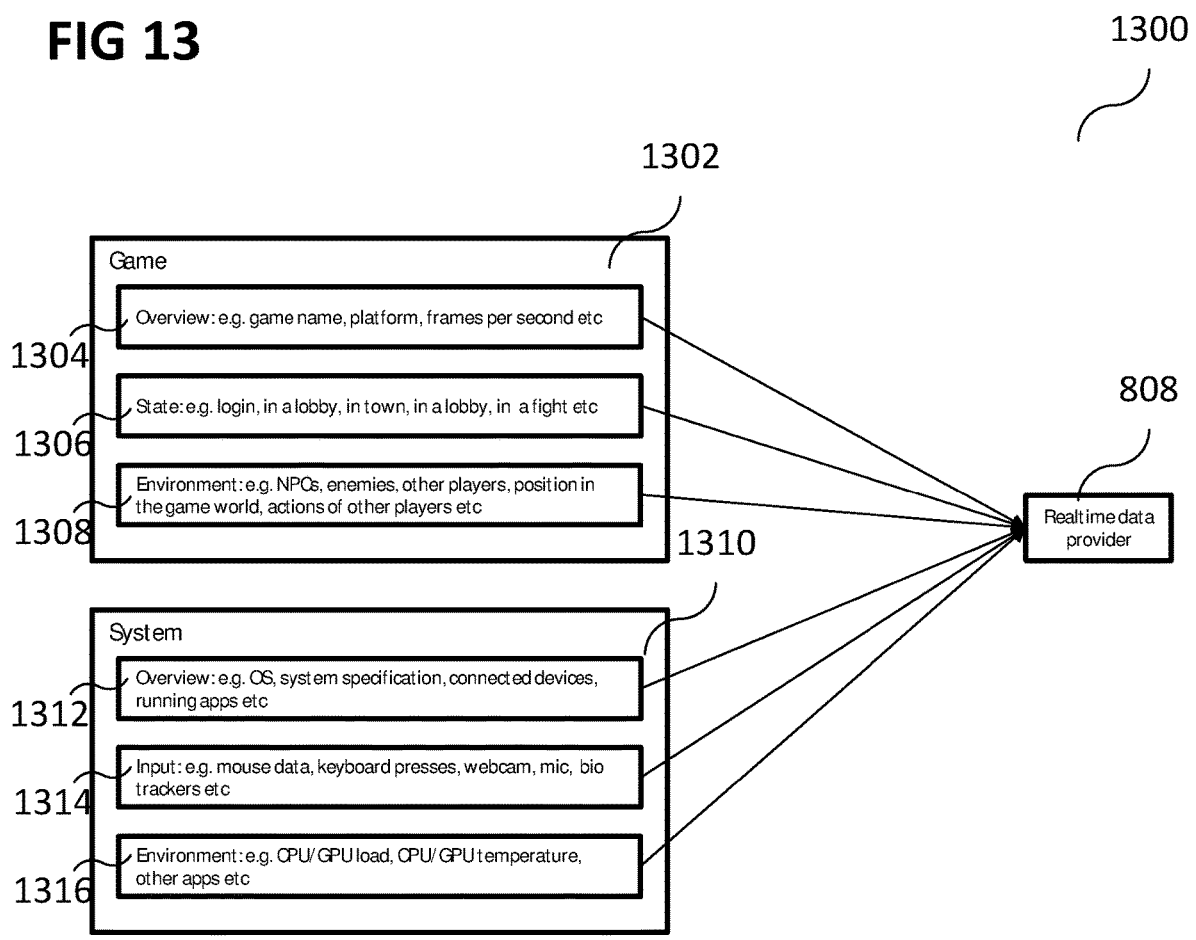
FIG. 13 shows an illustration of a real-time data provider according to various embodiments.

FIG. 13 shows an illustration 1300 of a real-time data provider 808 according to various embodiments. The real-time data provider 808 may be designed to figure out the data from the game 1302 that user is currently playing and also data from other sources 1310 (for example system information). This data includes:
  Which game the user is playing on and the platform that game runs on, like indicated in 1304;
  The state of the game e.g. is the user in the lobby, in town, in middle of a fight, like indicated in 1306;
  The situation of the game e.g. where are the enemies, where the user is in the virtual world, Quests that are in progress, like indicated in 1308;
  a system overview, for example operating system (OS), system specifications, connected devices, and/or running apps, like indicated in 1312;
  User's input into the system such as mouse, keyboard but should theoretically include mic and webcam and other devices, like indicated in 1314;
  The system's current operational information e.g. CPU (central processing unit)/GPU (graphics processing unit) load and temperature, like indicated in 1316.

Getting real-time information directly from the game 1302 may be not trivial and according to various embodiments, there may be provided various ways to do it:
  Getting an integration done in cooperation with the game developer may be ideal but may require the game developer to willingly expose their data to us through an API (application programming interface);
  Hooking into the game and determine the game state and environment based the memory of that used by the game;
  Perform analysis on images/audio/text that are presented to the user.

This live data may be provided to other modules according to various embodiments for their analyses.

Figure 14:
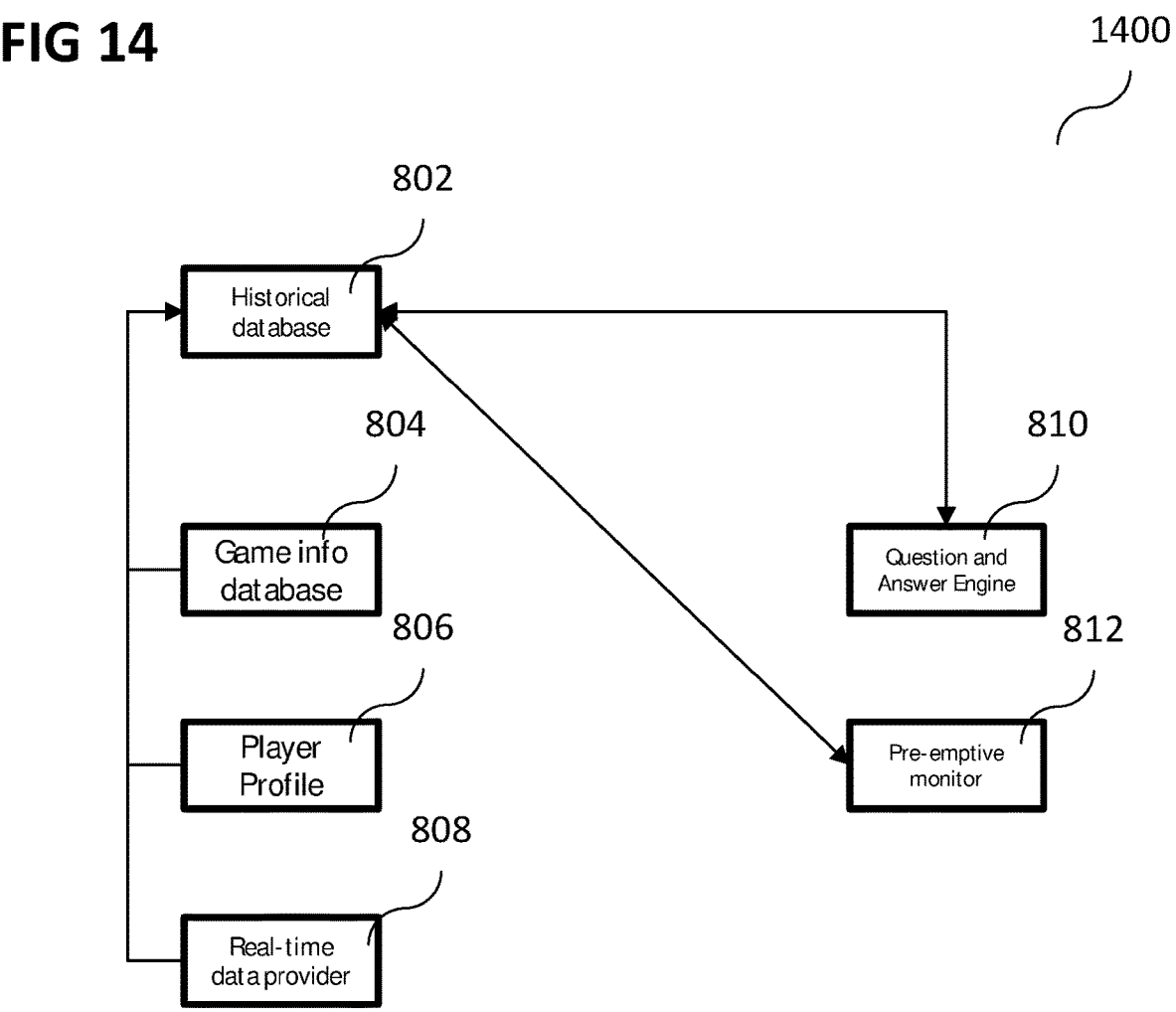
FIG. 14 shows an illustration including a historical database according to various embodiments.

FIG. 14 shows an illustration 1400 including a historical database 802 according to various embodiments. The historical database 802 may represent the data at a specific point in time. Game information (for example provided in the game info database 804) may change over time because of balances changes or new content. The player profile 806 may change because of changes in player preference or skill level. Real-time data (for example provided by the real-time data provider 808) may change as the game goes on. All such information may be catalogued in the historical database 802 to provide chronological context and correctness of data at a particular point in time.

The historical database 802 may furthermore collect and store information on past queries and answers given to a particular user and how that user responded and performed under those replies or hints.

FIG. 15 shows an illustration 1500 of a user interface according to various embodiments. The question an answer engine 810 may work (for example on a real-time basis) to accept queries and generate replies which are direct answers or direct guidance to the questions asked. On top of the game info database and the player profile, the question an answer engine 810 may use the real-time data from the real-time data provider to put those queries in the context that user is currently experiencing. The queries and answers to this module may need to be handled in a standard mechanism so that the question an answer engine 810 may consume queries in multiple formats and give replies in multiple formats.

A basic user interface may be pure text queries and replies, but the interface may be extensible to allow other forms interactions with the user, such as:
  Sending a text query 1516 and reply via text 1536 to the user;
  Listen to user's verbal queries (for example via audio 1512) and replies to the user through visual feedback 1534 or add to the audio 1532 that the user is listening to;
  Present user with a visual interface 1514 and provide an answer by overlaying an image on top of the game;
  and various combinations of these and the following interfaces.

The list above are exemplary interfaces, and further interactions may be provided, such as;

Being able to take input from human gestures 1518 and provide feedback in the form of tactile feedback (for example via vibration 1538 and/or pressure 1540);

Direct neural interfaces 1522;

Interactions with a person's sense of smell 1508 or taste 1510.

Such intelligence may be accessed by another machine or even another artificial intelligence through an API.

It is to be noted that depending on the interfaces that a user would like to interact with, there may be additional technologies provided such as:

For an audio input, speech recognition and natural language processing technologies may be provided;

For an audio output, speech to text technology may be provided;

For a visual output on top of the game, a game overlay technology may be provided.

Both the input and output may support multiple inputs/outputs at the same time. The input may be aggregated at an input aggregator 1502, which may be programmable using an API 1504. The input may then be provided to the question and answer machine 810. The outputs may be composited by an output compositor 1528, which may be programmable using an API 1530.

The question an answer engine 810 may combine multiple inputs into a single input and may deliver outputs across multiple medium and be able to deliver a coherent message instead of simply duplicating the message.

Further inputs may include depression of a button 1520, input by movement detection 1524, biosensors 1526, or touch sensors 1506. Further output may include heat 1542.

According to various embodiments, a constant monitor (for example a pre-emptive monitor 812), which may provide constant monitoring, may be provided. This component may continuously analyze the state of the game and the state of the player so that it can pre-emptively provide assistance to the player. The pre-emptive monitor 812 may directly access the information of the real-time data 808 provider to figure out what the user needs pre-emptively. The pre-emptive monitor 812 may format this as a query that would be sent to the question and answer module 810 and may retrieve the answer. The pre-emptive monitor 812 may present the result through the interfaces preferred by the user and delivered in a way consistent with direct question and answers which are initiated by the user.

The system according to various embodiments may be cyclic: It may record and examine its past answers and responses from the user so that the system may continuously learn and improve.

In the following, a use case example of a system and method according to various embodiments will be described. A user may start a League of Legends game while the system according to various embodiments may be running in the background. Once the user starts the game, the system according to various embodiments may continue to monitor and notice that the user had accumulated so much gold. The system according to various embodiments may show an overlay in game with the recommended item to buy, but the user may not be familiar with it. The user may hover his mouse cursor over the recommended item but even though it looks interesting, the user may not fully understand how this would affect his current game play. The user may verbally tell the system according to various embodiments to show more information about that item, and the system according to various embodiments may open up an overlay window to show the details of that item. The user may like that recommendation and may verbally tell the system according to various embodiments to remind him to buy that item when the user is back to his base. The system according to various embodiments may verbally confirm that it understood and may hide the item purchase recommendation. The system according to various embodiments may continue to monitor and when the user is back at this base, the system according to various embodiments may verbally remind the user that he should make the purchase, and may visually overlay the recommended item again. The user may purchase the item and the system according to various embodiments may hide its recommendation again.

According to various embodiments, constant monitoring may be provided.

According to various embodiments, advice may be offered which is relevant to the user's current situation.

According to various embodiments, a mechanism may be provided for a user to converse and get more information.

According to various embodiments, various inputs and outputs may be combined in this system.

According to various embodiments, game play may be smoother because a player may make better decisions with the game coach according to various embodiments.

The following examples pertain to further embodiments.

Example A1 is a data providing method comprising: determining a hypothetical question of a user using an application program; determining an answer to the hypothetical question; and providing the answer in the form of a hint to the user.

In example A2, the subject-matter of example A1 can optionally include: storing history information of at least one further database; and determining the hypothetical question based on the historical information.

In example A3, the subject-matter of any one of examples A1 to A2 can optionally include: storing application information about the application program used by the user; and determining the hypothetical question based on the application information.

In example A4, the subject-matter of any one of examples A1 to A3 can optionally include: storing profile information of the user; and determining the hypothetical question based on the profile information.

In example A5, the subject-matter of any one of examples A1 to A4 can optionally include: storing real-time information of at least one of the application program used by the user or of a system used by the user for executing the application program; and determining the hypothetical question based on the real-time information.

In example A6, the subject-matter of any one of examples A1 to A5 can optionally include: providing the hint to the user using at least one of audio information, visual information, text information, vibration information, pressure information, and heat information.

In example A7, the subject-matter of any one of examples A1 to A6 can optionally include: receiving a question from the user; determining an answer to the receive question; and providing the answer to the user.

In example A8, the subject-matter of example A7 can optionally include receiving the question from the user using at least one of audio information, visual information, text information, gestures information, button depression information, neural information, movement information, biosensor information, touch information, smell information, or taste information.

In example A9, the subject-matter of any one of examples A7 to A8 can optionally include providing the answer to the user using at least one of audio information, visual information, text information, vibration information, pressure information, and heat information.

In example A10, the subject-matter of any one of examples A1 to A9 can optionally include that the application program comprises a computer game.

Example A11 is a data providing system comprising: a question determination circuit configured to determine a hypothetical question of a user using an application program; an answer determination circuit configured to determine an answer to the hypothetical question; and a pre-emptive monitor circuit configured to provide the answer in the form of a hint to the user.

In example A12, the subject-matter of example A11 can optionally include: a historical database configured to store history information of at least one further database; wherein the question determination circuit configured to determine the hypothetical question based on the historical information.

In example A13, the subject-matter of any one of examples A11 to A12 can optionally include: an application information database configured to store application information about the application program used by the user; wherein the question determination circuit configured to determine the hypothetical question based on the application information.

In example A14, the subject-matter of any one of examples A11 to A13 can optionally include: a user profile memory configured to store profile information of the user; wherein the question determination circuit configured to determine the hypothetical question based on the profile information.

In example A15, the subject-matter of any one of examples A11 to A14 can optionally include: a real-time data memory configured to store real-time information of at least one of the application program used by the user or of a system used by the user for executing the application program; wherein the question determination circuit configured to determine the hypothetical question based on the real-time information.

In example A16, the subject-matter of any one of examples A11 to A15 can optionally include that the pre-emptive monitor circuit is configured to provide the hint to the user using at least one of audio information, visual information, text information, vibration information, pressure information, and heat information.

In example A17, the subject-matter of any one of examples A11 to A16 can optionally include: a question input circuit configured to receive a question from the user, wherein the answer determination circuit is configured to determine an answer to the receive question; and an answer providing circuit configured to provide the answer to the user.

In example A18, the subject-matter of example A17 can optionally include that the question input circuit is configured to receive the question from the user using at least one of audio information, visual information, text information, gestures information, button depression information, neural information, movement information, biosensor information, touch information, smell information, or taste information.

In example A19, the subject-matter of any one of examples A17 to A18 can optionally include that the answer providing circuit is configured to provide the answer to the user using at least one of audio information, visual information, text information, vibration information, pressure information, and heat information.

In example A20, the subject-matter of any one of examples A11 to A19 can optionally include that the application program comprises a computer game.

Example A21 is a computer-readable medium comprising instructions which, when executed by a computer, make the computer perform a data providing method, the data providing method comprising: determining a hypothetical question of a user using an application program; determining an answer to the hypothetical question; and providing the answer in the form of a hint to the user.

In example A22, the subject-matter of example A21 can optionally include instructions which, when executed by a computer, make the computer perform: storing history information of at least one further database; and determining the hypothetical question based on the historical information.

In example A23, the subject-matter of any one of examples A21 to A22 can optionally include instructions which, when executed by a computer, make the computer perform: storing application information about the application program used by the user; and determining the hypothetical question based on the application information.

In example A24, the subject-matter of any one of examples A21 to A23 can optionally include instructions which, when executed by a computer, make the computer perform: storing profile information of the user; and determining the hypothetical question based on the profile information.

In example A25, the subject-matter of any one of examples A21 to A24 can optionally include instructions which, when executed by a computer, make the computer perform: storing real-time information of at least one of the application program used by the user or of a system used by the user for executing the application program; and determining the hypothetical question based on the real-time information.

In example A26, the subject-matter of any one of examples A21 to A25 can optionally include instructions which, when executed by a computer, make the computer perform: providing the hint to the user using at least one of audio information, visual information, text information, vibration information, pressure information, and heat information.

In example A27, the subject-matter of any one of examples A21 to A26 can optionally include instructions which, when executed by a computer, make the computer perform: receiving a question from the user; determining an answer to the receive question; and providing the answer to the user.

In example A28, the subject-matter of example A27 can optionally include instructions which, when executed by a computer, make the computer perform: receiving the question from the user using at least one of audio information, visual information, text information, gestures information, button depression information, neural information, movement information, biosensor information, touch information, smell information, or taste information.

In example A29, the subject-matter of any one of examples A27 to A28 can optionally include instructions which, when executed by a computer, make the computer perform: providing the answer to the user using at least one of audio information, visual information, text information, vibration information, pressure information, and heat information.

In example A30, the subject-matter of any one of examples A21 to A29 can optionally include that the application program comprises a computer game.

Example B1 is a communication method comprising: generating a hint on solving a situation in an electronic game; and transmitting the hint to a server configured to provide the hint to gamers playing the electronic game.

In example B2, the subject-matter of example B1 can optionally include that the hint comprises at least one of textual information, audio information, or video information.

In example B3, the subject-matter of any one of examples B1 to B2 can optionally include that the hint is generated on a companion device configured to display a further hint.

In example B4, the subject-matter of example B3 can optionally include transmitting a vote for the further hint.

Example B5 is a communication method comprising: receiving a hint on solving a situation in an electronic game; storing the hint on a server; and providing the hint to gamers playing the electronic game.

In example B6, the subject-matter of example B5 can optionally include that the hints comprise at least one of textual information, audio information, or video information.

In example B7, the subject-matter of any one of examples B5 to B6 can optionally include storing a plurality of hints for a same situation on the server.

In example B8, the subject-matter of example B7 can optionally include receiving a vote for at least one hint of the plurality of hints.

In example B9, the subject-matter of example B8 can optionally include that a hint of the plurality of hints with a highest number of votes among the plurality of hints is provided to the gamers.

In example B10, the subject-matter of any one of examples B5 to B9 can optionally include that the hint is provided as at least one of an overlay to the electronic game or as a notification in a companion app.

Example B11 is a computer-readable medium comprising instructions which, when executed by a computer, make the computer perform a communication method, the communication method comprising: generating a hint on solving a situation in an electronic game; and transmitting the hint to a server configured to provide the hint to gamers playing the electronic game.

In example B12, the subject-matter of example B11 can optionally include that the hint comprises at least one of textual information, audio information, or video information.

In example B13, the subject-matter of any one of examples B11 to B12 can optionally include that the hint is generated on a companion device configured to display a further hint.

In example B14, the subject-matter of example B13 can optionally include instructions which, when executed by a computer, make the computer perform: transmitting a vote for the further hint.

Example B15 is a computer-readable medium comprising instructions which, when executed by a computer, make the computer perform a communication method, the communication method comprising: receiving a hint on solving a situation in an electronic game; storing the hint on a server; and providing the hint to gamers playing the electronic game.

In example B16, the subject-matter of example B15 can optionally include that the hints comprise at least one of textual information, audio information, or video information.

In example B17, the subject-matter of any one of examples B15 to B16 can optionally include instructions which, when executed by a computer, make the computer perform: storing a plurality of hints for a same situation on the server.

In example B18, the subject-matter of example B17 can optionally include instructions which, when executed by a computer, make the computer perform: receiving a vote for at least one hint of the plurality of hints.

In example B19, the subject-matter of example B18 can optionally include that a hint of the plurality of hints with a highest number of votes among the plurality of hints is provided to the gamers.

In example B20, the subject-matter of any one of examples B15 to B19 can optionally include that the hint is provided as at least one of an overlay to the electronic game or as a notification in a companion app.

Example B21 is a communication device comprising: a hint generation circuit configured to generate a hint on solving a situation in an electronic game; and a transmitter configured to transmit the hint to a server configured to provide the hint to gamers playing the electronic game.

In example B22, the subject-matter of examples B21 can optionally include that the hint comprises at least one of textual information, audio information, or video information.

In example B23, the subject-matter of any one of examples B21 to B22 can optionally include that the hint is generated on a companion device configured to display a further hint.

In example B24, the subject-matter of example B23 can optionally include that the transmitter is further configured to transmit a vote for the further hint.

Example B25 is a server comprising: a receiver configured to receive a hint on solving a situation in an electronic game; a storage configured to store the hint; and a transmitter configured to provide the hint to gamers playing the electronic game.

In example B26, the subject-matter of example B25 can optionally include that the hints comprise at least one of textual information, audio information, or video information.

In example B27, the subject-matter of any one of examples B25 to B26 can optionally include that the storage is further configured to store a plurality of hints for a same situation.

In example B28, the subject-matter of example B27 can optionally include that the receiver is further configured to receive a vote for at least one hint of the plurality of hints.

In example B29, the subject-matter of example B28 can optionally include that the transmitter is configured to provide a hint of the plurality of hints with a highest number of votes among the plurality of hints to the gamers.

In example B30, the subject-matter of any one of examples B25 to B29 can optionally include that the transmitter is configured to provide the hint as at least one of an overlay to the electronic game or as a notification in a companion app.

In a further example, any one or more of examples A1 to A30 and/or B1 to B30 may be combined.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A communication method comprising:
coupling a separately operating companion device to a gaming device for getting and providing a hint on gameplay;
generating the hint using a profile of a gamer, wherein the companion device further comprises:
providing a system that acts as a virtual coach directed to solving a situation in an electronic game on the gaming device to improve gameplay;
using a question and answer engine in the system to process inputs from the gamer;
transmitting the hint on a real-time basis to the gamer playing the electronic game;
monitoring the gamer's response to the hint provided by the companion device;
generating a further hint after the gamer's response; and
transmitting the further hint to the gamer.

2. The communication method of claim 1,
wherein the hint comprises at least one of textual information, audio information, or video information.

3. The communication method of claim 1,
wherein transmitting the hint and the further hint is directed to the companion device configured to display the hint and the further hint.

4. The communication method of claim 1, further comprising:
transmitting the hint is directed to the gaming device to display the hint and the further hint as a translucent overlay.

5. A communication method of claim 1, further comprising:
coupling the companion device to a server;
transmitting to and storing the hint on a server; and
providing the hint to other gainers playing the electronic game in real-time.

6. The communication method of claim 5, further comprising:
storing a plurality of hints for a same situation on the electronic game on a server.

7. The communication method of claim 6, further comprising:
the server receiving vote for at least one hint of the plurality of hints from the other garners playing the electronic game.

8. The communication method of claim 7,
wherein a preferred hint of the plurality of hints with a highest number of votes among the plurality of hints is provided to the other garners.

9. The communication method of claim 5,
wherein the hint is transmitted to the gamer after several unsuccessful attempts to solve the situation.

10. A communication device for use with a gaming device comprising:
a separately operating mobile device coupled to the gaming device for getting and providing a hint for gameplay;
a system that acts as a virtual coach to improve gameplay comprising:
a user interface configured to accept inputs from and provide outputs to a user;
a question and answer engine in the system for processing inputs from the user;
a hint generation circuit configured to generate the hint on solving a situation in an electronic game being played on the gaming device using a profile of the user; and
a transmitter configured to transmit the hint on a real-time basis the user playing the electronic game.

11. The communication device of claim 10,
wherein the hint comprises at least one of textual information, audio information, or video information.

12. The communication device of claim 10, further comprising the communication device being coupled to a server, wherein the server may provide bi-directional communications with the communication device.

13. The communication device of claim 12, further comprising the transmitter is further configured to transmit the hint to the server for sharing hints and other information with other garners.

14. The communication device of claim 10, further comprising the communication device being configured to pause the electronic game to permit the user to consider the hint.

15. The communication device of claim 10, further comprising the hint generation circuit being connected to a database, wherein the database may provide information relating to the electronic game to the user.

16. The communication device of claim 10, further comprising the hint generation circuit being connected to a database, wherein the database may provide information relating to the user.

17. The communication device of claim 10, further comprising the transmitting circuit being configured to display the hint on the user interface to display the hint.

18. The communication device of claim 10, further comprising the transmitting circuit being configured to display the hint to the gaming device as a translucent overlay.

19. The communication device of claim 10, further comprising a computer tablet installed with a companion application for the gaming device.

* * * * *